United States Patent
Pang et al.

(10) Patent No.: US 10,218,501 B2
(45) Date of Patent: Feb. 26, 2019

(54) METHOD, DEVICE, AND SYSTEM FOR ESTABLISHING SECURE CONNECTION

(71) Applicant: HUAWEI DEVICE (DONGGUAN) CO., LTD., Dongguan (CN)

(72) Inventors: Gaokun Pang, Shenzhen (CN); Zhiming Ding, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 152 days.

(21) Appl. No.: 15/282,598

(22) Filed: Sep. 30, 2016

(65) Prior Publication Data

US 2017/0026174 A1   Jan. 26, 2017

Related U.S. Application Data

(63) Continuation of application No. PCT/CN2015/075896, filed on Apr. 3, 2015.

(30) Foreign Application Priority Data

Apr. 3, 2014   (CN) .......................... 2014 1 0133485

(51) Int. Cl.
*H04L 9/32* (2006.01)
*H04L 9/08* (2006.01)
(Continued)

(52) U.S. Cl.
CPC .......... *H04L 9/0827* (2013.01); *H04L 9/0825* (2013.01); *H04L 9/0841* (2013.01);
(Continued)

(58) Field of Classification Search
None
See application file for complete search history.

(56) References Cited

U.S. PATENT DOCUMENTS 7,234,063 B1 * 6/2007 Baugher .............. H04L 9/0833
380/259
2007/0150735 A1   6/2007 Futa et al.
(Continued)

FOREIGN PATENT DOCUMENTS

CN           1868163 A      11/2006
CN         101277242 A      10/2008
(Continued)

*Primary Examiner* — Brandon S Hoffman

(57) ABSTRACT

A method includes: securely obtaining, by a first device, a first public key estimated value of a second device in an out-of-band manner; encrypting an asymmetric encryption public key by using the first public key estimated value; sending the encrypted asymmetric encryption public key to the second device; receiving an encrypted first key-exchange public key sent by the second device; decrypting the encrypted first key-exchange public key by using an asymmetric encryption private key; performing an operation based on the decrypted first key-exchange public key, to obtain a second public key estimated value; and when the first public key estimated value is consistent with the second public key estimated value, determining that the decrypted first key-exchange public key is correct, generating a shared key by using a key-exchange private key and the first key-exchange public key, and establishing a secure connection to the second device by using the shared key.

20 Claims, 14 Drawing Sheets

(51) Int. Cl.
  *H04W 12/04* (2009.01)
  *H04L 29/06* (2006.01)
  *H04L 9/14* (2006.01)
  *H04W 12/08* (2009.01)

(52) U.S. Cl.
  CPC .............. *H04L 9/14* (2013.01); *H04L 9/3242* (2013.01); *H04L 9/3247* (2013.01); *H04L 63/18* (2013.01); *H04W 12/04* (2013.01); *H04W 12/08* (2013.01); *H04L 2209/80* (2013.01)

(56) References Cited

U.S. PATENT DOCUMENTS

| | | |
|---|---|---|
| 2008/0240068 A1 | 10/2008 | Ishimoto |
| 2009/0327724 A1 | 12/2009 | Shah et al. |
| 2011/0107101 A1 | 5/2011 | Funk |
| 2013/0332739 A1 | 12/2013 | Yi et al. |

FOREIGN PATENT DOCUMENTS

| | | |
|---|---|---|
| CN | 101978652 A | 2/2011 |
| EP | 1104959 A2 | 6/2001 |
| WO | 2010023506 A1 | 3/2010 |

\* cited by examiner

CONT. FROM FIG. 7A | CONT. FROM FIG. 7A | CONT. FROM FIG. 7A

S706. The first device obtains a third public key estimated value of a third device S707. The first device encrypts the obtained third public key estimated value of the third device and sends the encrypted third public key estimated value to the second device S708. After the second device receives the encrypted third public key estimated value of the third device that is sent by the first device, the second device decrypts the received encrypted third public key estimated value, and encrypts an asymmetric encryption public key of the second device by using the decrypted third public key estimated value S709. Send first key-exchange public key information of the second device and the encrypted asymmetric encryption public key of the second device to the third device S710. The third device decrypts the received encrypted asymmetric encryption public key by using the third public key estimated value of the third device, encrypts a third key-exchange public key of the third device by using the decrypted asymmetric encryption public key, and generates a shared key by using a key-exchange private key of the third device and the first key-exchange public key obtained according to the first key-exchange public key information S711. Receive the encrypted third key-exchange public key sent by the third device, and decrypt the encrypted third key-exchange public key by using a private key corresponding to the asymmetric encryption public key of the second device S712. Perform, by using the preset algorithm, an operation on the third key-exchange public key obtained through decryption, to obtain a fourth public key estimated value; when the third public key estimated value is consistent with the fourth public key estimated value, the first device determines that the decrypted third key-exchange public key is correct, generates a shared key by using the key-exchange private key of the second device and the decrypted third key-exchange public key, and establishes a secure connection to the third device by using the shared key

FIG. 7B

CONT. FROM FIG. 8A    CONT. FROM FIG. 8A    CONT. FROM FIG. 8A

S806. The first device obtains a third public key estimated value of a fourth device, and encrypts the asymmetric encryption public key of the first device by using the obtained third public key estimated value S807. Send the second key-exchange public key information of the first device and the encrypted asymmetric encryption public key to the fourth device S808. The fourth device decrypts the received encrypted asymmetric encryption public key by using the third public key estimated value of the fourth device and encrypts a third key-exchange public key of the fourth device by using the decrypted asymmetric encryption public key; the fourth device generates a shared key by using a key-exchange private key of the fourth device and the second key-exchange public key obtained according to the second key-exchange public key information S809. Receive the encrypted third key-exchange public key sent by the fourth device, and decrypt the encrypted fourth key-exchange public key by using a private key corresponding to the asymmetric encryption public key S810. Perform, by using the preset algorithm, an operation on the third key-exchange public key obtained through decryption, to obtain a fourth public key estimated value; when the third public key estimated value is consistent with the fourth public key estimated value, the first device determines that the decrypted third key-exchange public key is correct, generates a shared key by using the key-exchange private key of the first device and the decrypted third key-exchange public key, and establishes a secure connection to the fourth device by using the shared key S811. The first device determines, based on the shared key generated with the second device and the shared key generated with the fourth device, connection information for establishing a secure connection between the second device and the fourth device S812. Send the determined connection information to the second device S812. Send the determined connection information to the fourth device

FIG. 8B

METHOD, DEVICE, AND SYSTEM FOR ESTABLISHING SECURE CONNECTION

CROSS-REFERENCE TO RELATED APPLICATIONS

This application is a continuation of International Application No. PCTPCT/CN2015/075896, filed on Apr. 3, 2015, which claims priority to Chinese Patent Application No. 201410133485.1, filed on Apr. 3, 2014. The disclosures of the aforementioned applications are hereby incorporated by reference in their entireties.

TECHNICAL FIELD

The present invention relates to the field of mobile communications technologies, and in particular, to a method, a device, and a system for establishing a secure connection.

BACKGROUND

WiFi Protected Setup (WPS, Wi-Fi Protected Setup) is a certification program implemented under organization of the Wireless Fidelity (WiFi, Wireless Fidelity) Alliance, and is mainly dedicated to simplifying setup of a wireless local area network (WLAN, Wireless Local Area Network) and configuration work of security performance. In a conventional manner, when setting up a wireless network, a user must set a security key at an access point manually, and then verify the key at a client to prevent an attacker from stealing WiFi resources. In the entire process, the user needs to have background knowledge about a WiFi device and have a capability of modifying a necessary configuration. The WPS can help the user to securely configure a network name (for example, a service set identifier (SSID, Service Set Identifier)), and configure powerful Wifi protected access (WPA, Wifi Protected Access) data encoding and authentication functions. To securely access the WLAN, the user needs to enter only a personal information number (PIN, Personal Identification Number). This greatly simplifies an operation of wireless security setup. However, in a WPS authentication process, only a PIN is required for network access, that is, if an attacker obtains the PIN, the attacker can steal WiFi resources of the wireless network.

In the prior art, a WPS configuration process may mainly include the following steps:

Step 1: A router and a terminal exchange their DH (Diffie-Hellman) public keys by using plaintexts.

Step 2: The router generates a shared key DH key by using a DH private key of the router and a DH public key of the terminal, and the terminal generates a shared key DH key by using a DH private key of the terminal and a DH public key of the router.

Step 3: The router generates a derivative key of the DH key according to the DH key generated by the router, and determines a hash value by using a hash algorithm and using the derivative key in combination with a first nonce generated by the router and a first half of a PIN.

Step 4: The router sends, to the terminal, the hash value determined in step 3 and the first nonce encrypted by using the derivative key generated in step 3.

Step 5: The terminal generates a derivative key of the DH key according to the DH key generated by the terminal, decrypts the first nonce, determines a hash value by using the hash algorithm and using the derivative key in combination with the first nonce and the first half of the PIN, and when the determined hash value is the same as the hash value that is determined by the router and received in step 4, continues to perform a subsequent step.

Step 6: The terminal determines a hash value by using the same hash algorithm used by the router and using the derivative key of the DH key of the terminal in combination with a second nonce and the first half of the PIN.

Step 7: The terminal sends, to the router, the hash value determined in step 5 and the second nonce encrypted by using the derivative key of the DH key of the terminal.

Step 8: The router decrypts the second nonce by using the derivative key of the DH key of the router, determines a hash value by using the hash algorithm and using the derivative key in combination with a second nonce generated by the router and the first half of the PIN, and when the determined hash value is the same as the hash value that is determined by the terminal and received in step 7, continues to perform a subsequent step.

Step 9: The router processes a second half of the PIN by using a method similar to that of step 3, obtains a hash value of the second half of the PIN, and sends it to the terminal.

Step 10: The terminal verifies the hash value of the second half of the PIN by using a method similar to that of step 5, and when the router passes the verification, determines that a secure connection is established with the router.

Step 11: The terminal processes the second half of the PIN by using a method similar to that of step 6, obtains a hash value of the second half of the PIN, and sends it to the router.

Step 12: The router verifies the hash value of the second half of the PIN by using a method similar to that of step 8, and when the terminal passes the verification, determines that a secure connection is established with the terminal.

In the foregoing WPS configuration process, an attacker may pretend to be a terminal knowing a PIN, exchange DH public keys with the router in step 1 by using a DH public key and a DH private key generated by the attacker, generate a shared key DH key between the attacker and the router in step 2, and receive a hash value that is generated based on a first half of the PIN and a first nonce and sent by the router in step 4 and the first nonce that is encrypted by using a derivative key of the DH key of the router.

Therefore, the attacker may decrypt the first nonce by using the shared key DHkey generated by the attacker and is the same as the DHkey of the router and using a derivative key of the DHkey. Because the attacker does not know the PIN, the attacker does not verify whether the received hash value sent by the router in step 4 is correct, but determines the first half of the PIN by using the decrypted first nonce and an offline exhaustive attack method. Because the first half of the PIN includes four digits, the attacker may perform the following operations on each four-digit number in sequence: determining a hash value by using the hash algorithm and the derivative key generated by the attacker in combination with the first nonce and the four-digit number, and when the determined hash value is the same as the received hash value sent by the router, determining that the four-digit number is the first half of the PIN. Because the PIN is relatively short, the attacker can calculate the first half of the PIN in an offline manner after $10^4$ attempts.

Further, in the first WPS configuration process performed between the router and the attacker, the attacker does not know the first half of the PIN (the first half of the PIN is obtained subsequently by using the offline exhaustive attack method), and therefore, in step 6, the attacker cannot obtain the hash value that is determined based on the first half of the PIN. Therefore, in step 8, the router can verify that there is a potential security risk, and therefore the router does not perform subsequent data communication.

To acquire a second half of the PIN, a second WPS configuration is required. Because the attacker has obtained the first half of the PIN through the first WPS configuration, the attacker may acquire the second half of the PIN in a similar manner. That is, in the second WPS configuration process, the attacker receives a hash value that is generated based on the second half of the PIN and the first nonce and sent by the router in step 9, and may obtain the second half of the PIN by using a manner similar to the manner of obtaining the first half of the PIN, that is, the offline exhaustive attack method. Therefore, the attacker can obtain the entire PIN through the first WPS configuration and the second WPS configuration. The attacker can steal WiFi resources by using the PIN. Apparently, the WPS configuration mechanism in the prior art has a security vulnerability, and is not secure.

SUMMARY

Embodiments of the present invention provide a method, a device, and a system for establishing a secure connection, to solve a problem of poor security of a network connection between devices in the prior art.

According to a first aspect, a method for establishing a secure connection is provided and includes:

securely obtaining, by a first device, a first public key estimated value of a second device in an out-of-band manner, where the first public key estimated value is a value obtained after an operation is performed based on a first key-exchange public key of the second device by using a preset algorithm;

encrypting, by the first device, an asymmetric encryption public key of the first device by using the obtained first public key estimated value;

sending, by the first device, the encrypted asymmetric encryption public key and second key-exchange public key information of the first device to the second device, where the second key-exchange public key information includes a second key-exchange public key of the first device, and the second key-exchange public key is used by the second device to generate a shared key by using the second key-exchange public key and a key-exchange private key of the second device and establish a secure connection to the first device by using the generated shared key;

receiving, by the first device, the encrypted first key-exchange public key of the second device that is sent by the second device, where the encrypted first key-exchange public key is obtained by the second device after the second device decrypts the received encrypted asymmetric encryption public key of the first device by using the first public key estimated value of the second device and encrypts the first key-exchange public key by using the decrypted asymmetric encryption public key of the first device;

decrypting, by the first device, the encrypted first key-exchange public key by using an asymmetric encryption private key corresponding to the asymmetric encryption public key;

performing, by the first device by using the preset algorithm, an operation based on the decrypted first key-exchange public key, to obtain a second public key estimated value; and when the first public key estimated value is consistent with the second public key estimated value, determining, by the first device, that the decrypted first key-exchange public key is correct, generating a shared key by using a key-exchange private key of the first device and the decrypted first key-exchange public key, and establishing a secure connection to the second device by using the shared key.

With reference to the first aspect, in a first possible implementation manner, the method further includes: after generating the shared key, generating, by the first device, first verification information, where the first verification information is a first encryption value obtained after the first device encrypts first designated information by using the generated shared key, or is a first hash value obtained after a hash operation is performed by using the generated shared key in combination with first designated information, or is a signature generated after first designated information is encrypted by using the asymmetric encryption private key, where the first designated information is information that is pre-agreed upon by the first device and the second device; and sending the first verification information to the second device, where the first verification information is used by the second device to verify, according to the received first verification information, whether the first device is trusted.

With reference to the first aspect or with reference to the first possible implementation manner of the first aspect, in a second possible implementation manner, the method further includes: receiving, by the first device, second verification information sent by the second device, where the second verification information is a second encryption value obtained after second designated information is encrypted by using the generated shared key after the shared key is generated by the second device, or is a second hash value obtained after a hash operation is performed by using the generated shared key in combination with second designated information, where the second designated information is information that is pre-agreed upon by the first device and the second device; and after the first device generates the shared key, the method further includes: when the second verification information is the second encryption value, decrypting the second encryption value by using the shared key generated by the first device; and determining, according to whether the second designated information obtained through decryption is correct, whether the generated shared key is available; or when the second verification information is the second hash value, performing a hash operation by using the shared key generated by the first device in combination with the second designated information; and determining, according to whether a hash value obtained by the first device matches the second hash value, whether the generated shared key is available.

With reference to the first aspect, or with reference to the first possible implementation manner of the first aspect, or with reference to the second possible implementation manner of the first aspect, in a third possible implementation manner, after the first device establishes the secure connection to the second device by using the shared key, the method further includes: securely obtaining, by the first device, a public key estimated value of a third device in an out-of-band manner; and encrypting the obtained public key estimated value of the third device, and sending the encrypted public key estimated value of the third device to the second device, where the public key estimated value of the third device is used by the second device to establish a secure connection to the third device based on the public key estimated value of the third device.

With reference to the first aspect, or with reference to the first possible implementation manner of the first aspect, or with reference to the second possible implementation manner of the first aspect, in a fourth possible implementation manner, after the first device establishes the secure connection to the second device by using the shared key, the method further includes: securely obtaining, by the first device, a third public key estimated value of a fourth device in an out-of-band manner; encrypting the asymmetric encryption public key of the first device by using the obtained third public key estimated value; sending, by the first device, the encrypted asymmetric encryption public key to the fourth device; receiving an encrypted third key-exchange public key of the fourth device that is sent by the fourth device, where the encrypted third key-exchange public key is obtained by the fourth device after the fourth device decrypts the received encrypted asymmetric encryption public key by using the third public key estimated value of the fourth device and encrypts the third key-exchange public key by using the decrypted asymmetric encryption public key; decrypting, by the first device, the encrypted third key-exchange public key by using a private key corresponding to the asymmetric encryption public key; performing, by using the preset algorithm, an operation based on the third key-exchange public key obtained through decryption, to obtain a fourth public key estimated value; and when the third public key estimated value is consistent with the fourth public key estimated value, determining, by the first device, that the decrypted third key-exchange public key is correct, generating a shared key by using the key-exchange private key of the first device and the decrypted third key-exchange public key, and establishing a secure connection to the fourth device by using the shared key; and after the first device establishes the secure connection to the second device and the first device establishes the secure connection to the fourth device, the method further includes: determining, by the first device based on the shared key generated with the second device and the shared key generated with the fourth device, connection information for establishing a secure connection between the second device and the fourth device; and sending the determined connection information to the second device and the fourth device separately.

With reference to the first aspect, or with reference to the first possible implementation manner of the first aspect, or with reference to the second possible implementation manner of the first aspect, in a fifth possible implementation manner, the second key-exchange public key information of the first device is the plaintext second key-exchange public key of the first device, or is the second key-exchange public key encrypted by using the first public key estimated value of the second device.

According to a second aspect, a method for establishing a secure connection is provided and includes:

receiving, by a first device, an encrypted asymmetric encryption public key of a second device that is sent by the second device, where the encrypted asymmetric encryption public key of the second device is encrypted by the second device by using a first public key estimated value of the first device that is securely obtained in an out-of-band manner, and the first public key estimated value is a value obtained after an operation is performed based on a first key-exchange public key of the first device by using a preset algorithm;

decrypting, by the first device, the received encrypted asymmetric encryption public key by using the first public key estimated value of the first device, and encrypting the first key-exchange public key of the first device by using the decrypted asymmetric encryption public key;

sending, by the first device, the encrypted first key-exchange public key to the second device, so that the second device decrypts the encrypted first key-exchange public key by using an asymmetric encryption private key corresponding to the asymmetric encryption public key and generates, by using the decrypted first key-exchange public key and a key-exchange private key of the second device, a shared key for establishing a secure connection to the first device;

obtaining, by the first device, a second key-exchange public key of the second device; and generating, by the first device, a shared key by using a key-exchange private key of the first device and the obtained second key-exchange public key, and establishing a secure connection to the second device by using the shared key.

With reference to the second aspect, in a first possible implementation manner, the method further includes: receiving, by the first device, third verification information sent by the second device, where the third verification information is a third encryption value obtained by the second device after third designated information is encrypted by using the generated shared key, or is a third hash value obtained by the second device after a hash operation is performed on third designated information by using the generated shared key, or is a signature generated after third designated information is encrypted by the second device by using the asymmetric encryption private key, where the third designated information is information that is pre-agreed upon by the first device and the second device; and after the first device generates the shared key, the method further includes: when the third verification information is the third encryption value, decrypting, by the first device, the third encryption value by using the shared key generated by the first device; and determining, according to whether the third designated information obtained through decryption is correct, whether the generated shared key is available; or when the third verification information is the third hash value, performing, by the first device, a hash operation on the third designated information by using the shared key generated by the first device; and determining, according to whether a hash value obtained by the first device matches the third hash value, whether the generated shared key is available; or when the third verification information is the encrypted signature, decrypting, by the first device, the encrypted signature by using the asymmetric encryption public key; and determining, according to whether the third designated information obtained through decryption is correct, whether the second device is trusted.

With reference to the second aspect or with reference to the first possible implementation manner of the second aspect, in a second possible implementation manner, the method further includes: after generating the shared key, generating, by the first device, fourth verification information by using the generated shared key, where the fourth verification information is a fourth encryption value obtained by the first device after fourth designated information is encrypted by using the generated shared key, or is a fourth hash value obtained after a hash operation is performed on fourth designated information by using the generated shared key, where the fourth designated information is information that is pre-agreed upon by the first device and the second device; and sending the fourth verification information to the second device, where the fourth verification information is used by the second device to verify, according to the received fourth verification information, whether the first device is trusted.

With reference to the second aspect, or with reference to the first possible implementation manner of the second aspect, or with reference to the second possible implementation manner of the second aspect, in a third possible implementation manner, the obtaining, by the first device, a second key-exchange public key of the second device, specifically includes: receiving second key-exchange public key information sent by the second device, where the second key-exchange public key information is the plaintext second key-exchange public key or the second key-exchange public key encrypted by using the public key estimated value of the first device; and when the received second key-exchange public key information is the encrypted second key-exchange public key, decrypting the encrypted second key-exchange public key by using the public key estimated value of the first device, to obtain the decrypted second key-exchange public key.

With reference to the second aspect, or with reference to the first possible implementation manner of the second aspect, or with reference to the second possible implementation manner of the second aspect, in a fourth possible implementation manner, after the secure connection is established with the second device by using the shared key, the method further includes: receiving, by the first device, an encrypted third public key estimated value of a third device that is sent by the second device; decrypting the received encrypted third public key estimated value, and encrypting an asymmetric encryption public key of the first device by using the decrypted third public key estimated value; sending, by the first device, the encrypted asymmetric encryption public key to the third device; receiving an encrypted third key-exchange public key sent by the third device, where the encrypted third key-exchange public key is obtained by the third device after the third device decrypts the received encrypted asymmetric encryption public key by using the third public key estimated value of the third device and encrypts the third key-exchange public key by using the decrypted asymmetric encryption public key; decrypting, by the first device, the encrypted third key-exchange public key by using an asymmetric encryption private key corresponding to the asymmetric encryption public key; performing, by using the preset algorithm, an operation based on the third key-exchange public key obtained through decryption, to obtain a fourth public key estimated value; and when the third public key estimated value is consistent with the fourth public key estimated value, determining, by the first device, that the decrypted third key-exchange public key is correct, generating a shared key by using the key-exchange private key of the first device and the decrypted third key-exchange public key, and establishing a secure connection to the third device by using the shared key.

According to a third aspect, a device for establishing a secure connection is provided and includes:

an obtaining module, configured to securely obtain a first public key estimated value of a second device in an out-of-band manner, where the first public key estimated value is a value obtained after an operation is performed based on a first key-exchange public key of the second device by using a preset algorithm;

an encryption module, configured to encrypt an asymmetric encryption public key of the device by using the first public key estimated value obtained by the obtaining module;

a sending module, configured to send the asymmetric encryption public key encrypted by the encryption module and second key-exchange public key information of the first device to the second device, where the second key-exchange public key information includes a second key-exchange public key of the first device, and the second key-exchange public key is used by the second device to generate a shared key by using the second key-exchange public key and a key-exchange private key of the second device and establish a secure connection to the first device by using the generated shared key;

a receiving module, configured to receive the encrypted first key-exchange public key of the second device that is sent by the second device, where the encrypted first key-exchange public key is obtained by the second device after the second device decrypts the received encrypted asymmetric encryption public key of the device by using the first public key estimated value of the second device and encrypts the first key-exchange public key by using the decrypted asymmetric encryption public key of the device;

a decryption module, configured to decrypt, by using an asymmetric encryption private key corresponding to the asymmetric encryption public key, the encrypted first key-exchange public key received by the receiving module;

an operation module, configured to perform, by using the preset algorithm, an operation based on the first key-exchange public key obtained by the decryption module through decryption, to obtain a second public key estimated value; and a generation module, configured to: when the first public key estimated value is consistent with the second public key estimated value obtained by the operation module, determine that the decrypted first key-exchange public key is correct, generate a shared key by using a key-exchange private key of the device and the decrypted first key-exchange public key, and establish a secure connection to the second device by using the shared key.

With reference to the third aspect, in a first possible implementation manner, the generation module is further configured to generate first verification information after generating the shared key, where the first verification information is a first encryption value obtained by the generation module after first designated information is encrypted by using the generated shared key, or is a first hash value obtained by the generation module after a hash operation is performed by using the generated shared key in combination with first designated information, or is a signature generated by the generation module after first designated information is encrypted by using the asymmetric encryption private key, where the first designated information is information that is pre-agreed upon by the device and the second device; and the sending module is further configured to send the first verification information generated by the generation module to the second device, where the first verification information is used by the second device to verify, according to the received first verification information, whether the device is trusted.

With reference to the third aspect or with reference to the first possible implementation manner of the third aspect, in a second possible implementation manner, the receiving module is further configured to receive second verification information sent by the second device, where the second verification information is a second encryption value obtained after second designated information is encrypted by using the generated shared key after the shared key is generated by the second device, or is a second hash value obtained after a hash operation is performed by using the generated shared key in combination with second designated information, where the second designated information is information that is pre-agreed upon by the device and the second device; the decryption module is further configured to: after the shared key is generated, when the second verification information received by the receiving module is the second encryption value, decrypt the second encryption value by using the shared key generated by the generation module, and when the second verification information is the second hash value, perform a hash operation by using the shared key generated by the generation module in combination with the second designated information; and the generation module is further configured to determine, according to whether the second designated information obtained by the decryption module after the second encryption value is decrypted is correct, whether the generated shared key is available, and determine, according to whether a hash value obtained by the decryption module after the hash operation is performed on the second designated information matches the second hash value, whether the generated shared key is available.

With reference to the third aspect, or with reference to the first possible implementation manner of the third aspect, or with reference to the second possible implementation manner of the third aspect, in a third possible implementation manner, the obtaining module is further configured to securely obtain a public key estimated value of a third device in an out-of-band manner after the device establishes the secure connection to the second device by using the shared key; and the sending module is further configured to encrypt the public key estimated value of the third device that is obtained by the obtaining module, and send the encrypted public key estimated value of the third device to the second device, where the public key estimated value of the third device is used by the second device to establish a secure connection to the third device based on the public key estimated value of the third device.

With reference to the third aspect, or with reference to the first possible implementation manner of the third aspect, or with reference to the second possible implementation manner of the third aspect, in a fourth possible implementation manner, the obtaining module is further configured to securely obtain a third public key estimated value of a fourth device in an out-of-band manner after the device establishes the secure connection to the second device by using the shared key; the encryption module is further configured to encrypt the asymmetric encryption public key of the device by using the third public key estimated value obtained by the obtaining module; the sending module is further configured to send the asymmetric encryption public key encrypted by the encryption module to the fourth device; the receiving module is further configured to receive an encrypted third key-exchange public key of the fourth device that is sent by the fourth device, where the encrypted third key-exchange public key is obtained by the fourth device after the fourth device decrypts the received encrypted asymmetric encryption public key by using the third public key estimated value of the fourth device and encrypts the third key-exchange public key by using the decrypted asymmetric encryption public key; the decryption module is further configured to decrypt, by using a private key corresponding to the asymmetric encryption public key, the encrypted third key-exchange public key received by the receiving module; the operation module is further configured to perform, by using the preset algorithm, an operation based on the third key-exchange public key obtained through decryption, to obtain a fourth public key estimated value; the generation module is further configured to: when the third public key estimated value is consistent with the fourth public key estimated value obtained by the operation module, determine that the decrypted third key-exchange public key is correct, generate a shared key by using the key-exchange private key of the device and the decrypted third key-exchange public key, and establish a secure connection to the fourth device by using the shared key; and after the device establishes the secure connection to the second device and the device establishes the secure connection to the fourth device, determine, based on the shared key generated with the second device and the shared key generated with the fourth device, connection information for establishing a secure connection between the second device and the fourth device; and the sending module is further configured to send the connection information determined by the generation module to the second device and the fourth device separately.

With reference to the third aspect, or with reference to the first possible implementation manner of the third aspect, or with reference to the second possible implementation manner of the third aspect, in a fifth possible implementation manner, the second key-exchange public key information of the first device that is sent by the sending module is the plaintext second key-exchange public key of the first device, or is the second key-exchange public key encrypted by using the first public key estimated value of the second device.

According to a fourth aspect, a device for establishing a secure connection is provided and includes:

a receiving module, configured to receive an encrypted asymmetric encryption public key of a second device that is sent by the second device, where the encrypted asymmetric encryption public key of the second device is encrypted by the second device by using a first public key estimated value of the device that is securely obtained in an out-of-band manner, and the first public key estimated value is a value obtained after an operation is performed based on a first key-exchange public key of the device by using a preset algorithm;

a decryption module, configured to decrypt, by using the first public key estimated value of the device, the encrypted asymmetric encryption public key received by the receiving module;

an encryption module, configured to encrypt the first key-exchange public key of the device by using the asymmetric encryption public key decrypted by the decryption module;

a sending module, configured to send the first key-exchange public key encrypted by the encryption module to the second device, so that the second device decrypts the encrypted first key-exchange public key by using an asymmetric encryption private key corresponding to the asymmetric encryption public key and generates, by using the decrypted first key-exchange public key and a key-exchange private key of the second device, a shared key for establishing a secure connection to the device;

an obtaining module, configured to obtain a second key-exchange public key of the second device; and a generation module, configured to generate a shared key by using a key-exchange private key of the device and the second key-exchange public key obtained by the obtaining module, and establish a secure connection to the second device by using the shared key.

With reference to the fourth aspect, in a first possible implementation manner, the receiving module is further configured to receive third verification information sent by the second device, where the third verification information is a third encryption value obtained by the second device after third designated information is encrypted by using the generated shared key, or is a third hash value obtained by the second device after a hash operation is performed on third designated information by using the generated shared key, or is a signature generated after third designated information is encrypted by the second device by using the asymmetric encryption private key, where the third designated information is information that is pre-agreed upon by the device and the second device; the decryption module is further configured to: after the generation module generates the shared key, when the third verification information is the third encryption value, decrypt the third encryption value by using the shared key generated by the generation module, and when the third verification information is the third hash value, perform a hash operation on the third designated information by using the shared key generated by the generation module, and when the third verification information is the encrypted signature, decrypt the encrypted signature by using the asymmetric encryption public key; and the generation module is further configured to determine, according to whether the third designated information obtained by the decryption module after the third encryption value is decrypted is correct, whether the generated shared key is available, and determine, according to whether a hash value obtained by the decryption module after the hash operation is performed on the third designated information matches the third hash value, whether the generated shared key is available, and determine, according to whether the third designated information obtained by the decryption module after the encrypted signature is decrypted is correct, whether the second device is trusted.

With reference to the fourth aspect or with reference to the first possible implementation manner of the fourth aspect, in a second possible implementation manner, the generation module is further configured to generate fourth verification information by using the generated shared key after the shared key is generated, where the fourth verification information is a fourth encryption value obtained by the generation module after fourth designated information is encrypted by using the generated shared key, or is a fourth hash value obtained by the generation module after a hash operation is performed on fourth designated information by using the generated shared key, where the fourth designated information is information that is pre-agreed upon by the device and the second device; and the sending module is further configured to send the fourth verification information generated by the generation module to the second device, where the fourth verification information is used by the second device to verify, according to the received fourth verification information, whether the device is trusted.

With reference to the fourth aspect, or with reference to the first possible implementation manner of the fourth aspect, or with reference to the second possible implementation manner of the fourth aspect, in a third possible implementation manner, the obtaining module is specifically configured to receive second key-exchange public key information sent by the second device, where the second key-exchange public key information is the plaintext second key-exchange public key or the second key-exchange public key encrypted by using the public key estimated value of the device; and when the received second key-exchange public key information is the encrypted second key-exchange public key, decrypt the encrypted second key-exchange public key by using the public key estimated value of the device, to obtain the decrypted second key-exchange public key.

With reference to the fourth aspect, or with reference to the first possible implementation manner of the fourth aspect, or with reference to the second possible implementation manner of the fourth aspect, in a fourth possible implementation manner, the device further includes an operation module, where: the receiving module is further configured to receive, after the generation module establishes the secure connection to the second device by using the shared key, an encrypted third public key estimated value of a third device that is sent by the second device; the decryption module is further configured to decrypt the encrypted third public key estimated value received by the receiving module; the encryption module is further configured to encrypt an asymmetric encryption public key of the device by using the third public key estimated value decrypted by the decryption module; the sending module is further configured to send the encrypted asymmetric encryption public key to the third device; the receiving module is further configured to receive, after the sending module sends the encrypted asymmetric encryption public key to the third device, an encrypted third key-exchange public key sent by the third device, where the encrypted third key-exchange public key is obtained by the third device after the third device decrypts the received encrypted asymmetric encryption public key by using the third public key estimated value of the third device and encrypts the third key-exchange public key by using the decrypted asymmetric encryption public key; the decryption module is further configured to decrypt, by using an asymmetric encryption private key corresponding to the asymmetric encryption public key, the encrypted third key-exchange public key received by the receiving module; the operation module is configured to perform, by using the preset algorithm, an operation based on the third key-exchange public key obtained by the decryption module through decryption, to obtain a fourth public key estimated value; and the generation module is further configured to: when the third public key estimated value is consistent with the fourth public key estimated value, determine that the decrypted third key-exchange public key is correct, generate a shared key by using the key-exchange private key of the device and the decrypted third key-exchange public key, and establish a secure connection to the third device by using the shared key.

According to a fifth aspect, a system for establishing a secure connection is provided and includes the device provided by the third aspect or any one of the possible implementation manners of the third aspect, and the device provided by the fourth aspect or any one of the possible implementation manners of the fourth aspect.

According to a sixth aspect, a device for establishing a secure connection is provided and includes:

a processor, configured to securely obtain a first public key estimated value of a second device in an out-of-band manner, where the first public key estimated value is a value obtained after an operation is performed based on a first key-exchange public key of the second device by using a preset algorithm, and encrypt an asymmetric encryption public key of the device by using the obtained first public key estimated value;

a transmitter, configured to send the asymmetric encryption public key encrypted by the processor and second key-exchange public key information of the first device to the second device, where the second key-exchange public key information includes a second key-exchange public key of the first device, and the second key-exchange public key is used by the second device to generate a shared key by using the second key-exchange public key and a key-exchange private key of the second device and establish a secure connection to the first device by using the generated shared key; and a receiver, configured to receive the encrypted first key-exchange public key of the second device that is sent by the second device, where the encrypted first key-exchange public key is obtained by the second device after the second device decrypts the received encrypted asymmetric encryption public key of the device by using the first public key estimated value of the second device and encrypts the first key-exchange public key by using the decrypted asymmetric encryption public key of the device; where the processor is further configured to decrypt, by using an asymmetric encryption private key corresponding to the asymmetric encryption public key, the encrypted first key-exchange public key received by the receiver; perform, by using the preset algorithm, an operation based on the first key-exchange public key obtained through decryption, to obtain a second public key estimated value; and when the first public key estimated value is consistent with the second public key estimated value, determine that the decrypted first key-exchange public key is correct, generate a shared key by using a key-exchange private key of the device and the decrypted first key-exchange public key, and establish a secure connection to the second device by using the shared key.

With reference to the sixth aspect, in a first possible implementation manner, the processor is further configured to generate first verification information after generating the shared key, where the first verification information is a first encryption value obtained by the processor after first designated information is encrypted by using the generated shared key, or is a first hash value obtained by the processor after a hash operation is performed by using the generated shared key in combination with first designated information, or is a signature generated after first designated information is encrypted by the processor by using the asymmetric encryption private key, where the first designated information is information that is pre-agreed upon by the device and the second device; and the transmitter is further configured to send the first verification information generated by the processor to the second device, where the first verification information is used by the second device to verify, according to the received first verification information, whether the device is trusted.

With reference to the sixth aspect or with reference to the first possible implementation manner of the sixth aspect, in a second possible implementation manner, the receiver is further configured to receive second verification information sent by the second device, where the second verification information is a second encryption value obtained after second designated information is encrypted by using the generated shared key after the shared key is generated by the second device, or is a second hash value obtained after a hash operation is performed by using the generated shared key in combination with second designated information, where the second designated information is information that is pre-agreed upon by the device and the second device; and the processor is further configured to: after the shared key is generated, when the second verification information received by the receiver is the second encryption value, decrypt the second encryption value by using the shared key generated by the processor; when the second verification information is the second hash value, perform a hash operation by using the shared key generated by the processor in combination with the second designated information; determine, according to whether the second designated information obtained after the second encryption value is decrypted is correct, whether the generated shared key is available; and determine, according to whether a hash value obtained by the processor after the hash operation is performed on the second designated information matches the second hash value, whether the generated shared key is available.

With reference to the sixth aspect, or with reference to the first possible implementation manner of the sixth aspect, or with reference to the second possible implementation manner of the sixth aspect, in a third possible implementation manner, the processor is further configured to securely obtain a public key estimated value of a third device in an out-of-band manner after the device establishes the secure connection to the second device by using the shared key; and the transmitter is further configured to encrypt the public key estimated value of the third device that is obtained by the processor, and send the encrypted public key estimated value of the third device to the second device, where the public key estimated value of the third device is used by the second device to establish a secure connection to the third device based on the public key estimated value of the third device.

With reference to the sixth aspect, or with reference to the first possible implementation manner of the sixth aspect, or with reference to the second possible implementation manner of the sixth aspect, in a fourth possible implementation manner, the processor is further configured to securely obtain a third public key estimated value of a fourth device in an out-of-band manner after the device establishes the secure connection to the second device by using the shared key, and encrypt the asymmetric encryption public key of the device by using the obtained third public key estimated value; the transmitter is further configured to send the asymmetric encryption public key encrypted by the processor to the fourth device; the receiver is further configured to receive an encrypted third key-exchange public key of the fourth device that is sent by the fourth device, where the encrypted third key-exchange public key is obtained by the fourth device after the fourth device decrypts the received encrypted asymmetric encryption public key by using the third public key estimated value of the fourth device and encrypts the third key-exchange public key by using the decrypted asymmetric encryption public key; the processor is further configured to decrypt, by using a private key corresponding to the asymmetric encryption public key, the encrypted third key-exchange public key received by the receiver; perform, by using the preset algorithm, an operation based on the third key-exchange public key obtained through decryption, to obtain a fourth public key estimated value; when the third public key estimated value is consistent with the fourth public key estimated value, determine that the decrypted third key-exchange public key is correct, generate a shared key by using the key-exchange private key of the device and the decrypted third key-exchange public key, and establish a secure connection to the fourth device by using the shared key; and after the device establishes the secure connection to the second device and the device establishes the secure connection to the fourth device, determine, based on the shared key generated with the second device and the shared key generated with the fourth device, connection information for establishing a secure connection between the second device and the fourth device; and the transmitter is further configured to send the connection information determined by the processor to the second device and the fourth device separately.

With reference to the sixth aspect, or with reference to the first possible implementation manner of the sixth aspect, or with reference to the second possible implementation manner of the sixth aspect, in a fifth possible implementation manner, the second key-exchange public key information of the first device that is sent by the transmitter is the plaintext second key-exchange public key of the first device, or is the second key-exchange public key encrypted by using the first public key estimated value of the second device.

According to a seventh aspect, a device for establishing a secure connection is provided and includes:

a receiver, configured to receive an encrypted asymmetric encryption public key of a second device that is sent by the second device, where the encrypted asymmetric encryption public key of the second device is encrypted by the second device by using a first public key estimated value of the device that is securely obtained in an out-of-band manner, and the first public key estimated value is a value obtained after an operation is performed based on a first key-exchange public key of the device by using a preset algorithm;

a processor, configured to decrypt, by using the first public key estimated value of the device, the encrypted asymmetric encryption public key received by the receiver, and encrypt the first key-exchange public key of the device by using the decrypted asymmetric encryption public key; and a transmitter, configured to send the first key-exchange public key encrypted by the processor to the second device, so that the second device decrypts the encrypted first key-exchange public key by using an asymmetric encryption private key corresponding to the asymmetric encryption public key and generates, by using the decrypted first key-exchange public key and a key-exchange private key of the second device, a shared key for establishing a secure connection to the device; where the processor is further configured to obtain a second key-exchange public key of the second device, generate a shared key by using a key-exchange private key of the device and the obtained second key-exchange public key, and establish a secure connection to the second device by using the shared key.

With reference to the seventh aspect, in a first possible implementation manner, the receiver is further configured to receive third verification information sent by the second device, where the third verification information is a third encryption value obtained by the second device after third designated information is encrypted by using the generated shared key, or is a third hash value obtained by the second device after a hash operation is performed on third designated information by using the generated shared key, or is a signature generated after third designated information is encrypted by the second device by using the asymmetric encryption private key, where the third designated information is information that is pre-agreed upon by the device and the second device; and the processor is further configured to: after the shared key is generated, when the third verification information is the third encryption value, decrypt the third encryption value by using the generated shared key; when the third verification information is the third hash value, perform a hash operation on the third designated information by using the generated shared key; when the third verification information is the encrypted signature, decrypt the encrypted signature by using the asymmetric encryption public key; determine, according to whether the third designated information obtained after the third encryption value is decrypted is correct, whether the generated shared key is available; determine, according to whether a hash value obtained after the hash operation is performed on the third designated information matches the third hash value, whether the generated shared key is available; and determine, according to whether the third designated information obtained after the encrypted signature is decrypted is correct, whether the second device is trusted.

With reference to the seventh aspect or with reference to the first possible implementation manner of the seventh aspect, in a second possible implementation manner, the processor is further configured to generate fourth verification information by using the generated shared key after the shared key is generated, where the fourth verification information is a fourth encryption value obtained after fourth designated information is encrypted by using the generated shared key, or is a fourth hash value obtained after a hash operation is performed on fourth designated information by using the generated shared key, where the fourth designated information is information that is pre-agreed upon by the device and the second device; and the transmitter is further configured to send the fourth verification information generated by the processor to the second device, where the fourth verification information is used by the second device to verify, according to the received fourth verification information, whether the device is trusted.

With reference to the seventh aspect, or with reference to the first possible implementation manner of the seventh aspect, or with reference to the second possible implementation manner of the seventh aspect, in a third possible implementation manner, the processor is specifically configured to receive second key-exchange public key information sent by the second device, where the second key-exchange public key information is the plaintext second key-exchange public key or the second key-exchange public key encrypted by using the public key estimated value of the device; and when the received second key-exchange public key information is the encrypted second key-exchange public key, decrypt the encrypted second key-exchange public key by using the public key estimated value of the device, to obtain the decrypted second key-exchange public key.

With reference to the seventh aspect, or with reference to the first possible implementation manner of the seventh aspect, or with reference to the second possible implementation manner of the seventh aspect, in a fourth possible implementation manner, the receiver is further configured to receive, after the processor establishes the secure connection to the second device by using the shared key, an encrypted third public key estimated value of a third device that is sent by the second device; the processor is further configured to decrypt the encrypted third public key estimated value received by the receiver, and encrypt an asymmetric encryption public key of the device by using the decrypted third public key estimated value; the transmitter is further configured to send the encrypted asymmetric encryption public key to the third device; the receiver is further configured to receive, after the transmitter sends the encrypted asymmetric encryption public key to the third device, an encrypted third key-exchange public key sent by the third device, where the encrypted third key-exchange public key is obtained by the third device after the third device decrypts the received encrypted asymmetric encryption public key by using the third public key estimated value of the third device and encrypts the third key-exchange public key by using the decrypted asymmetric encryption public key; and the processor is further configured to decrypt, by using an asymmetric encryption private key corresponding to the asymmetric encryption public key, the encrypted third key-exchange public key received by the receiver; perform, by using the preset algorithm, an operation based on the third key-exchange public key obtained through decryption, to obtain a fourth public key estimated value; and when the third public key estimated value is consistent with the fourth public key estimated value, determine that the decrypted third key-exchange public key is correct, generate a shared key by using the key-exchange private key of the device and the decrypted third key-exchange public key, and establish a secure connection to the third device by using the shared key.

According to an eighth aspect, a system for establishing a secure connection is provided and includes the device provided by the sixth aspect or any one of the possible implementation manners of the sixth aspect, and the device provided by the seventh aspect or any one of the possible implementation manners of the seventh aspect.

Advantageous effects of the embodiments of the present invention include:

The embodiments of the present invention provide a method, a device, and a system for establishing a secure connection, which are different from the prior art. In the prior art, a first device and a second device exchange their DH public keys by using plaintexts; therefore, an attacker may pretend to be the first device knowing a PIN and obtain the DH public key of the second device, generate a shared key by using a DH private key generated by the attacker, obtain a first half value of the PIN by performing a first WPS configuration process with the second device based on a derivative key generated from the shared key, then obtain a second half value of the PIN by performing a second WPS configuration process with the second device, and thereby obtain the entire PIN and steal WiFi resources.

In the first method for establishing a secure connection according to the embodiments of the present invention, in contrast to the prior art, a first device and a second device neither exchange their DH public keys (which may correspond to key-exchange public keys in the embodiments of the present invention) by using plaintexts, nor exchange encrypted PINs based on shared keys; instead, the first device securely obtains a first public key estimated value of the second device in an out-of-band manner, where the first public key estimated value is different from the PIN used in the prior art, where the PIN may be any preset value, but the first public key estimated value is a value obtained after an operation is performed based on a first key-exchange public key of the second device by using a preset algorithm. An attacker cannot securely obtain the first public key estimated value of the second device in an out-of-band manner legally, and even if the attacker pretends to be the first device knowing the first public key estimated value, the attacker cannot obtain the first public key estimated value through two WPS configuration processes in the prior art. This is because in the method for establishing a secure connection according to the embodiments of the present invention, the first device needs to encrypt an asymmetric encryption public key of the first device by using the obtained first public key estimated value, and send the encrypted asymmetric encryption public key to the second device; the second device decrypts the encrypted asymmetric encryption public key by using the first public key estimated value of the second device, encrypts the first key-exchange public key of the second device by using the asymmetric encryption public key, and sends the encrypted first key-exchange public key to the first device; assuming that the attacker pretends to be the first device, and assuming that there is a first public key estimated value and that the attacker uses the first public key estimated value to encrypt an asymmetric encryption public key of the attacker and sends the encrypted asymmetric encryption public key to the second device, the second device cannot obtain a correct asymmetric encryption public key after using the correct first public key estimated value for decryption; then the second device encrypts the first key-exchange public key by using an incorrect asymmetric encryption public key and sends the encrypted first key-exchange public key to the attacker; the attacker cannot obtain the first key-exchange public key even by using an asymmetric encryption private key of the attacker and therefore cannot establish a secure connection to the second device; in addition, even if the attacker initiates multiple WPS processes as in the prior art, the attacker cannot establish a secure connection to the second device, and therefore cannot steal WiFi resources. Therefore, security of a network connection between devices is enhanced.

In addition, the first device sends second key-exchange public key information of the first device to the second device; when the second key-exchange public key information is a plaintext, the second key-exchange public key is different from the DH public keys exchanged between the first device and the second device by using plaintexts in the prior art. In the first method for establishing a secure connection according to the embodiments of the present application, only the first device can transmit the second key-exchange public key information of the first device to the second device in plaintext. Even if the attacker intercepts the plaintext second key-exchange public key of the first device, and pretends to be the first device to send the intercepted second key-exchange public key to the second device, so that the second device generates a shared key by using the second key-exchange public key and a key-exchange private key of the second device, the attacker still cannot obtain the first public key estimated value of the second device, and cannot generate a shared key corresponding to the shared key generated by the second device. Therefore, in a subsequent 4-way handshake performed based on the shared key with the second device, because the shared key cannot be verified through the 4-way handshake, the 4-way handshake between the attacker and the second device fails, and subsequent data transmission cannot continue. Optionally, when the second key-exchange public key information is a second key-exchange public key encrypted by using the first public key estimated value, the attacker cannot decrypt the second key-exchange public key information, and therefore cannot obtain the plaintext second key-exchange public key. Therefore, security is further enhanced.

In the second method for establishing a secure connection according to the embodiments of the present invention, a first device and a second device neither exchange their DH public keys by using plaintexts, nor exchange encrypted PINs based on shared keys; instead, the second device securely obtains a first public key estimated value of the first device in an out-of-band manner, where the first public key estimated value is different from the PIN, where the PIN may be the first public key estimated value or may be any preset value, but the first public key estimated value is a value obtained after an operation is performed based on a first key-exchange public key of the second device by using a preset algorithm. An attacker cannot securely obtain the first public key estimated value of the first device in an out-of-band manner legally, and even if the attacker pretends to be the second device knowing the first public key estimated value, the attacker cannot obtain the first public key estimated value through two WPS configuration processes in the prior art. This is because in the method for establishing a secure connection according to the embodiments of the present invention, the second device needs to encrypt an asymmetric encryption public key of the second device by using the obtained first public key estimated value, and send the encrypted asymmetric encryption public key to the first device; the first device decrypts the encrypted asymmetric encryption public key by using the first public key estimated value of the first device, encrypts a first key-exchange public key of the first device by using the asymmetric encryption public key, and sends the encrypted first key-exchange public key to the second device; assuming that the attacker pretends to be the second device, and assuming that there is a first public key estimated value and that the attacker uses the first public key estimated value to encrypt an asymmetric encryption public key of the attacker and sends the encrypted asymmetric encryption public key to the first device, the first device cannot obtain a correct asymmetric encryption public key after using the correct first public key estimated value for decryption; then the first device encrypts the first key-exchange public key by using an incorrect asymmetric encryption public key and sends the encrypted first key-exchange public key to the attacker; the attacker cannot obtain the first key-exchange public key even by using an asymmetric encryption private key of the attacker and therefore cannot establish a secure connection to the first device; in addition, even if the attacker initiates multiple WPS processes as in the prior art, the attacker cannot establish a secure connection to the first device, and therefore cannot steal WiFi resources. Therefore, security of a network connection between devices is enhanced.

In addition, the first device obtains a second key-exchange public key of the second device; when the second key-exchange public key is a plaintext, the second key-exchange public key is different from the DH public keys exchanged between the first device and the second device by using plaintexts in the prior art. In the second method for establishing a secure connection according to the embodiments of the present application, only the second device can transmit the second key-exchange public key of the second device to the first device in plaintext. Even if the attacker intercepts the plaintext second key-exchange public key of the second device, and pretends to be the second device to send the intercepted second key-exchange public key to the first device, so that the first device generates a shared key by using the second key-exchange public key and a key-exchange private key of the first device, the attacker still cannot obtain the first public key estimated value of the first device, and cannot generate a shared key corresponding to the shared key generated by the first device. Therefore, in a subsequent 4-way handshake performed based on the shared key with the first device, because the shared key cannot be verified through the 4-way handshake, the 4-way handshake between the attacker and the first device fails, and subsequent data transmission cannot continue. Optionally, when the second key-exchange public key information is a second key-exchange public key encrypted by using the first public key estimated value, the attacker cannot decrypt the second key-exchange public key information, and therefore cannot obtain the plaintext second key-exchange public key. Therefore, security is further enhanced.

BRIEF DESCRIPTION OF THE DRAWINGS

FIG. 7A and FIG. 7B are a flowchart of a method for establishing a secure connection according to Embodiment 5 of the present invention;

FIG. 8A and FIG. 8B are a flowchart of a method for establishing a secure connection according to Embodiment 6 of the present invention;

DETAILED DESCRIPTION

Embodiments of the present invention provide a method, a device, and a system for establishing a secure connection. The following describes exemplary embodiments of the present invention with reference to the accompanying drawings of this specification. It should be understood that the exemplary embodiments described herein are merely used to describe and explain the present invention, but are not intended to limit the present invention. In addition, in a case of non-contradiction, the embodiments in the present application and features in the embodiments may be combined with each other.

Figure 1:
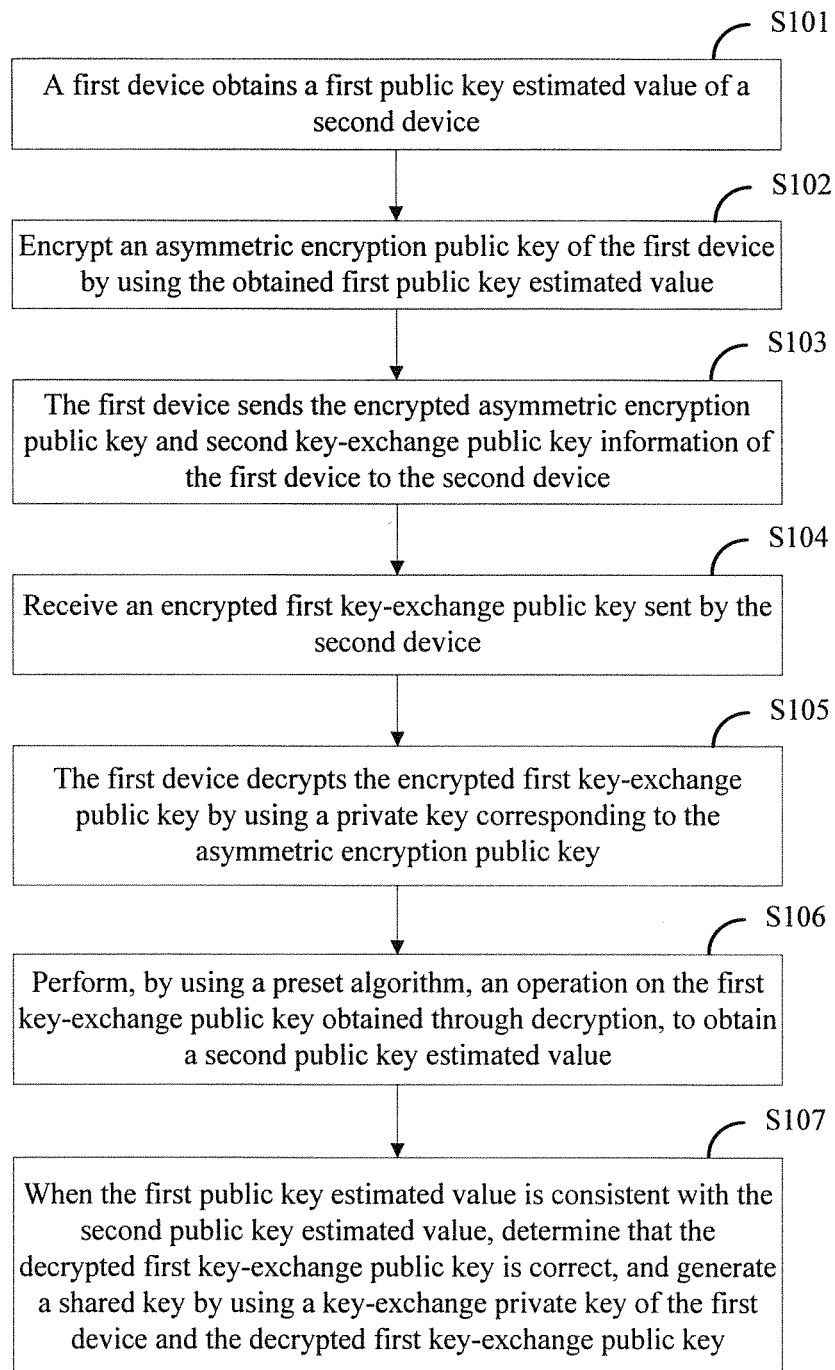
FIG. 1 is a flowchart of a method for establishing a secure connection according to an embodiment of the present invention.

An embodiment of the present invention provides a method for establishing a secure connection. The method may be applied to a registrar device or an enrollee device. When a first device is a registrar device, a second device is an enrollee device, or vice versa. As shown in FIG. 1, the method includes:

S101. A first device securely obtains a first public key estimated value of a second device in an out-of-band manner.

The public key estimated value in the present invention may be a value obtained after an operation is performed based on a key-exchange public key of a device by using a preset algorithm. The first public key estimated value is a value obtained after an operation is performed based on a first key-exchange public key of the second device by using a preset algorithm.

S102. The first device encrypts an asymmetric encryption public key of the first device by using the obtained first public key estimated value.

S103. The first device sends the encrypted asymmetric encryption public key and second key-exchange public key information of the first device to the second device, where the second key-exchange public key information includes a second key-exchange public key of the first device, and the second key-exchange public key is used by the second device to generate a shared key by using the second key-exchange public key and a key-exchange private key of the second device and establish a secure connection to the first device by using the generated shared key.

S104. The first device receives an encrypted first key-exchange public key of the second device that is sent by the second device.

The encrypted first key-exchange public key is obtained by the second device after the second device decrypts the received encrypted asymmetric encryption public key of the first device by using the first public key estimated value of the second device and encrypts the first key-exchange public key by using the decrypted asymmetric encryption public key of the first device.

S105. The first device decrypts the encrypted first key-exchange public key by using an asymmetric encryption private key corresponding to the asymmetric encryption public key.

S106. The first device performs, by using a preset algorithm, an operation based on the first key-exchange public key obtained through decryption, to obtain a second public key estimated value.

S107. When the first public key estimated value is consistent with the second public key estimated value, the first device determines that the decrypted first key-exchange public key is correct, generates a shared key by using a key-exchange private key of the first device and the decrypted first key-exchange public key, and establishes a secure connection to the second device by using the shared key.

Figure 2:
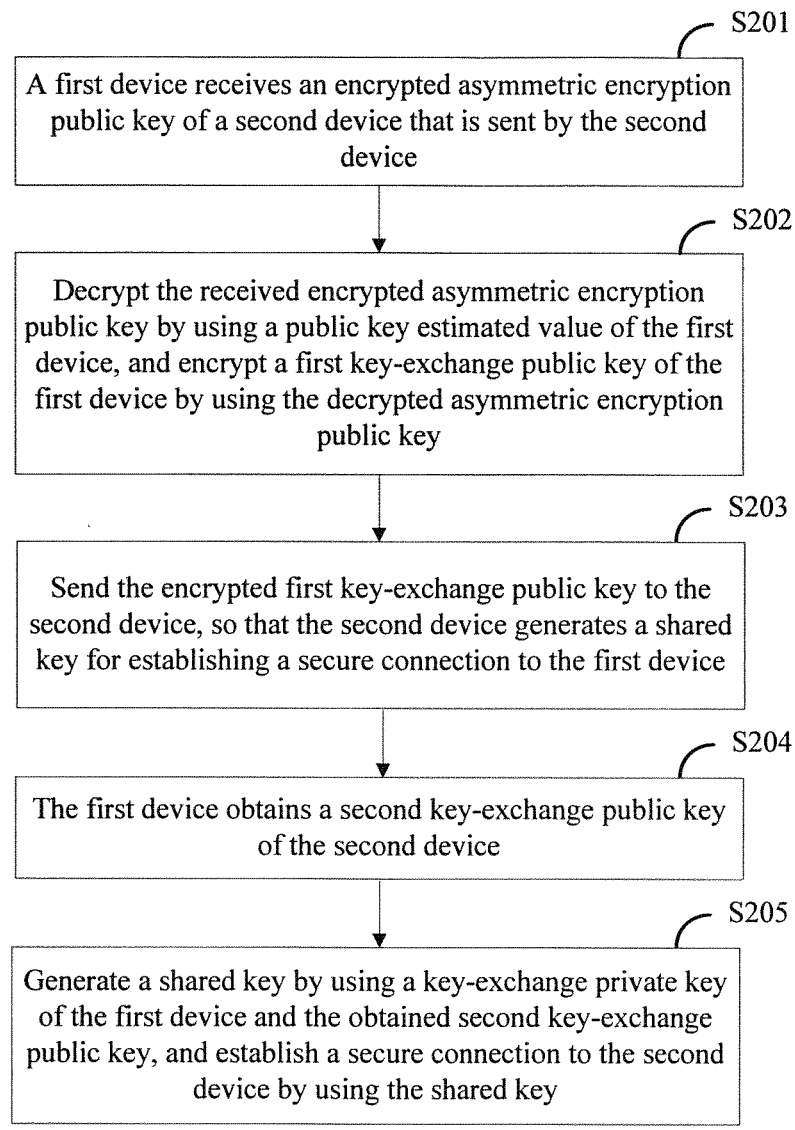
FIG. 2 is a flowchart of a method for establishing a secure connection according to an embodiment of the present invention.

Corresponding to the method shown in FIG. 1, a method for establishing a secure connection is further provided by an embodiment of the present invention. The method is applied to a device corresponding to the device to which the method shown in FIG. 1 is applied. When the device to which the method shown in FIG. 1 is applied is a registrar device, the device to which this embodiment is applied is an enrollee device, or vice versa. As shown in FIG. 2, the method includes:

S201. A first device receives an encrypted asymmetric encryption public key of a second device that is sent by the second device.

The encrypted asymmetric encryption public key of the second device is encrypted by the second device by using a first public key estimated value of the first device that is securely obtained in an out-of-band manner, and the first public key estimated value is a value obtained after an operation is performed based on a first key-exchange public key of the first device by using a preset algorithm.

S202. The first device decrypts the received encrypted asymmetric encryption public key by using a first public key estimated value of the first device, and encrypts a first key-exchange public key of the first device by using the decrypted asymmetric encryption public key.

S203. The first device sends the encrypted first key-exchange public key to the second device, so that the second device decrypts the encrypted first key-exchange public key by using an asymmetric encryption private key corresponding to the asymmetric encryption public key and generates, by using the decrypted first key-exchange public key and a key-exchange private key of the second device, a shared key for establishing a secure connection to the first device.

S204. The first device obtains a second key-exchange public key of the second device.

S205. The first device generates a shared key by using a key-exchange private key of the first device and the obtained second key-exchange public key, and establishes a secure connection to the second device by using the shared key.

Further, the method for establishing a secure connection according to the embodiment of the present invention may be applied to a WPS configuration process. That is, when the method shown in FIG. 1 is applied to a registrar device, the method shown in FIG. 2 is applied to an enrollee device; when the method shown in FIG. 1 is applied to an enrollee device, the method shown in FIG. 2 is applied to a registrar device.

The following describes the methods and related devices provided by the present invention in detail with reference to specific embodiments and accompanying drawings.

Embodiment 1

Figure 3:
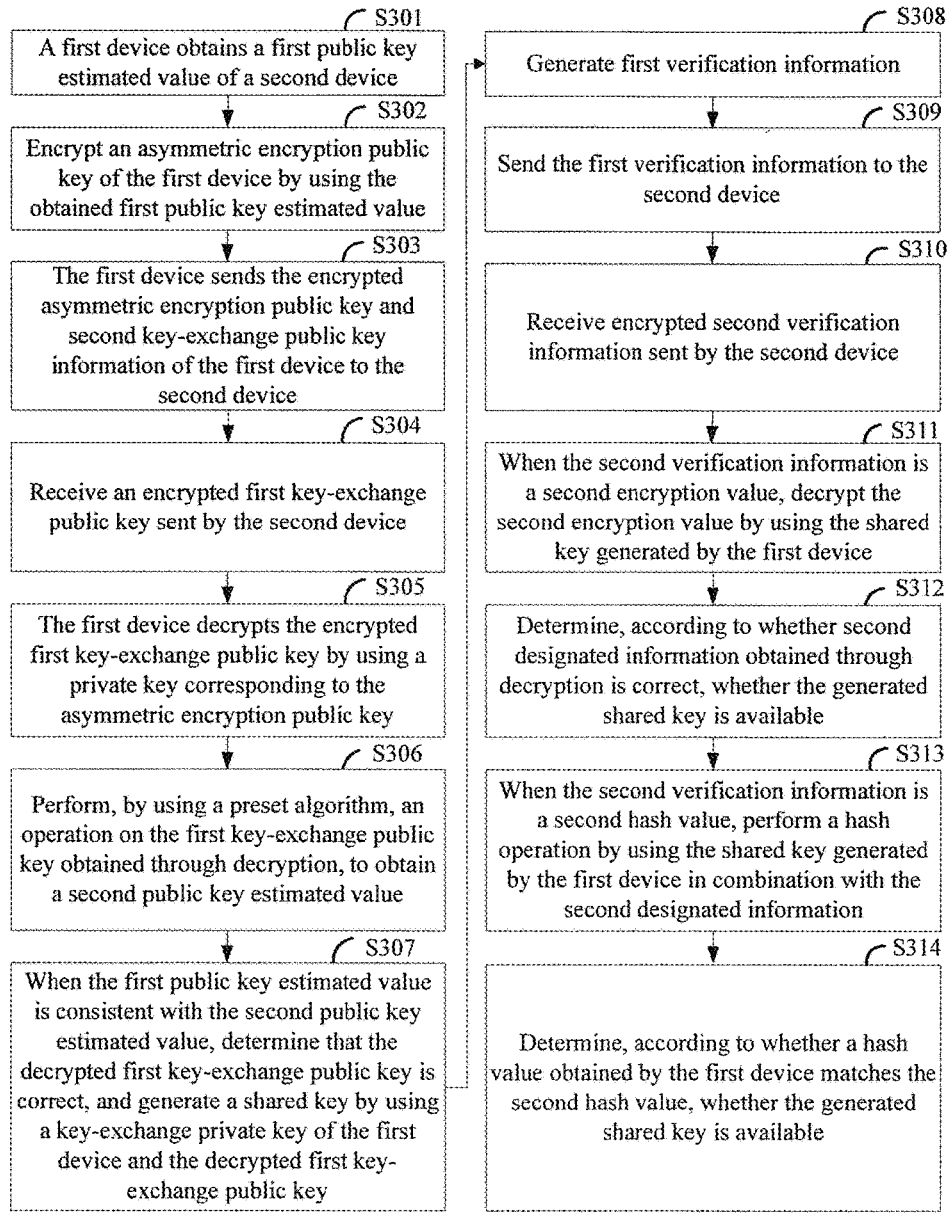
FIG. 3 is a flowchart of a method for establishing a secure connection according to Embodiment 1 of the present invention.

Embodiment 1 of the present invention provides a method for establishing a secure connection. The method is applied to a registrar device or an enrollee device. As shown in FIG. 3, the method specifically includes the following steps:

S301. A first device securely obtains a first public key estimated value of a second device in an out-of-band manner.

Further, in this step, the first device may obtain the first public key estimated value from the second device in an out-of-band manner. The out-of-band manner may be any manner except a WiFi manner, for example, a manual input manner, a near field communication (NFC, Near Field Communication) manner, a universal serial bus (USB, Universal Serial BUS) manner, a manner of scanning a two-dimensional code, secure media such as low-power WiFi (that is, WiFi transmit power causes a WiFi transmission distance to be within a secure distance, less than one meter) manner, and a manner of acquisition from a third device except the first device and the second device. That is, the first device may acquire the first public key estimated value of the second device from the third device. If the third device stores the first public key estimated value of the second device, the first device may acquire the first public key estimated value of the second device from the third device in the out-of-band manner. For example, if the third device stores a multi-dimensional code image of the second device, the first device may scan the multi-dimensional code image displayed on a display screen of the third device to acquire the first public key estimated value of the second device.

Further, the first public key estimated value is obtained after an operation is performed based on a first key-exchange public key of the second device by using a preset algorithm. That is, the first public key estimated value may be obtained after an operation is performed on the first key-exchange public key of the second device by using the preset algorithm, or may be obtained after an operation is performed on the first key-exchange public key of the second device and designated information by using the preset algorithm. The designated information may be pre-agreed information, for example, some or all content of a designated packet, or a hash operation value of some or all content of a designated packet. The preset algorithm may be a hash algorithm, a truncation algorithm, or the like. That is, the first public key estimated value may be a hash value of the first key-exchange public key, or a truncated value of the first key-exchange public key, or a hash value of the first key-exchange public key in combination with the designated information, or a truncated value of the first key-exchange public key in combination with the designated information, or the like. The second device may also provide a label, where the label includes the first public key estimated value.

Further, information of the second device that is obtained by the first device may further include a Medium Access Control (MAC, Medium Access Control) address of the second device, a type of the second device (for example, an access point (AP, Access Point), a sensor (sensor), or a common device), and a role of the second device (for example, a group owner (GO, Group Owner) device/client (client) in a point to point (P2P, Point to Point) connection process, or a registrar (registrar)/enrollee (enrollee) in a WPS connection process), in addition to the first public key estimated value of the second device. The second device may further provide a dynamic label, where the dynamic label may include a channel number of the second device, used for accelerating a discovery process between devices, a nonce used for keeping freshness of a message or generating information, and the like. A type of information that the first device needs to specifically acquire from the second device may be set according to an actual requirement.

S302. The first device encrypts an asymmetric encryption public key of the first device by using the obtained first public key estimated value.

Further, in this step, the first device encrypts the asymmetric encryption public key of the first device by using the first public key estimated value. This is a symmetric encryption process. That is, a key used for encryption is the same as a key used for decryption. Because the second device knows the first public key estimated value, the second device can decrypt the encrypted asymmetric encryption public key by using the first public key estimated value, to obtain the decrypted asymmetric encryption public key.

Further, the asymmetric encryption public key of the first device may be generated dynamically or may be fixed.

S303. The first device sends the encrypted asymmetric encryption public key and second key-exchange public key information of the first device to the second device, where the second key-exchange public key information includes a second key-exchange public key of the first device, and the second key-exchange public key is used by the second device to generate a shared key by using the second key-exchange public key and a key-exchange private key of the second device and establish a secure connection to the first device by using the generated shared key.

Further, in this step, the second key-exchange public key information of the first device may be sent to the second device. The asymmetric encryption public key and the second key-exchange public key information may be sent in a same data packet to the second device, or may be sequentially sent to the second device by using different data packets. The second key-exchange public key information is the second key-exchange public key transmitted in plaintext, or the second key-exchange public key encrypted and sent to the second device. The second key-exchange public key is used by the second device to generate the shared key by using the second key-exchange public key and the key-exchange private key of the second device.

Further, before or after the first device sends the second key-exchange public key information and the encrypted asymmetric encryption public key to the second device, the first device may send a corresponding key exchange algorithm and an asymmetric encryption algorithm to the second device, or a data packet for sending the second key-exchange public key and/or the encrypted asymmetric encryption public key may carry a corresponding key exchange algorithm, for example, a (DH, Diffie-Hellman) key exchange algorithm and an asymmetric encryption algorithm, for example, an (RSA, Ron Rivest, Adi Shamirh) asymmetric encryption algorithm.

S304. The first device receives an encrypted first key-exchange public key of the second device that is sent by the second device.

The encrypted first key-exchange public key is obtained by the second device after the second device decrypts the received encrypted asymmetric encryption public key of the first device by using the first public key estimated value of the second device and encrypts the first key-exchange public key by using the decrypted asymmetric encryption public key of the first device.

S305. The first device decrypts the encrypted first key-exchange public key by using an asymmetric encryption private key corresponding to the asymmetric encryption public key.

Further, in this embodiment, to ensure security of a WiFi connection, the asymmetric encryption public key cannot be transmitted in plaintext but needs to be encrypted for transmission. Assuming that the asymmetric encryption public key is transmitted in plaintext, an attacker may generate its own asymmetric encryption public key and asymmetric encryption private key, and pretend to be the first device to send the generated asymmetric encryption public key to the second device; the second device encrypts the first key-exchange public key by using the asymmetric encryption public key and sends the encrypted first key-exchange public key to the attacker; the attacker may perform decryption by using the asymmetric encryption private key generated by the attacker, and can obtain the first key-exchange public key, and therefore may calculate the first public key estimated value in an offline manner. In transmission of the asymmetric encryption public key encrypted by using the first public key estimated value, when the attacker pretends to be the second device, because the attacker does not know the first public key estimated value, the attacker cannot decrypt the asymmetric encryption public key when the attacker receives the asymmetric encryption public key encrypted by the first device by using the first public key estimated value. In subsequent steps, if the attacker pretends to be the second device and encrypts an incorrect first key-exchange public key by using an incorrect asymmetric encryption public key, the first device verifies that the received first key-exchange public key is incorrect. Therefore, a subsequent interaction cannot continue.

Further, in this embodiment, the second key-exchange public key information is a plaintext second key-exchange public key, or is a second key-exchange public key encrypted by using the first public key estimated value. That is, the second key-exchange public key of the first device may be transmitted in a plaintext form, or may be encrypted for transmission, because even if the attacker pretends to be the second device and acquires the second key-exchange public key of the first device, and generates a shared key with the first device, the shared key may also be verified during a 4-way handshake with the first device subsequently, so that the attacker cannot continue a subsequent data interaction.

Further, when the second key-exchange public key information is a second key-exchange public key encrypted by using the first public key estimated value, before the second key-exchange public key information is sent to the second device, the method further includes: encrypting the second key-exchange public key by using the first public key estimated value, to obtain the second key-exchange public key information.

Further, in this embodiment, to ensure security of a WiFi connection, the first key-exchange public key is encrypted in an asymmetric encryption manner. Assuming that the first key-exchange public key is encrypted in a symmetric encryption manner, the attacker may intercept the asymmetric encryption public key that is encrypted by using the first public key estimated value and sent by the first device to the second device, and the first key-exchange public key that is encrypted by using the asymmetric encryption public key and sent by the second device to the first device. In this case, the attacker may try a first public key estimated value in an offline exhaustive attack method, for example, decrypt the encrypted asymmetric encryption public key by using the tried first public key estimated value, to obtain an assumed asymmetric encryption public key, decrypt the encrypted first key-exchange public key by using the assumed asymmetric encryption public key, to obtain an assumed first key-exchange public key, then calculate an assumed first public key estimated value by using the assumed first key-exchange public key, and when the obtained assumed first public key estimated value is the same as the first public key estimated value tried when the encrypted asymmetric encryption public key is decrypted, determine a correct first public key estimated value. However, if the first key-exchange public key is encrypted in the asymmetric encryption manner, because the asymmetric encryption private key is known by only the first device, the attacker cannot obtain the first public key estimated value in the offline exhaustive attack method. That is, in an offline state, the attacker cannot determine a correct first public key estimated value by trying a first public key estimated value. Therefore, security of the WiFi connection is ensured.

Further, assuming that the attacker attempts to obtain the first public key estimated value in an online exhaustive attack method, that is, the attacker tries all possible first public key estimated values and initiates connections to the second device, and assuming that the first public key estimated value includes an 8-digit number, the attacker can determine the first public key estimated value only after initiating millions of, tens of millions of, or even hundreds of millions of connections, but protective measures of the first device or the second device do not allow the attacker to initiate so many connections.

S306. The first device performs, by using a preset algorithm, an operation based on the first key-exchange public key obtained through decryption, to obtain a second public key estimated value.

Further, in this step, before determining, according to the obtained first public key estimated value, whether the decrypted first key-exchange public key is correct, the first device may acquire the preset algorithm in an out-of-band manner, that is, before determining, according to the obtained first public key estimated value, whether the decrypted first key-exchange public key is correct, may obtain the preset algorithm before obtaining the first public key estimated value, or after obtaining the first public key estimated value, or from a same data packet from which the first public key estimated value is obtained. The preset algorithm may be used for performing an operation based on the decrypted first key-exchange public key, to verify whether the decrypted first key-exchange public key determined in step S305 is correct and further verify whether the second device is trustworthy.

Further, if the first public key estimated value is obtained after an operation is performed on the first key-exchange public key of the second device and designated information by using the preset algorithm, the first device may also acquire the designated information in an out-of-band manner before determining, according to the obtained first public key estimated value, whether the decrypted first key-exchange public key is correct.

S307. When the first public key estimated value is consistent with the second public key estimated value obtained in step S306, the first device determines that the decrypted first key-exchange public key is correct, generates a shared key by using a key-exchange private key of the first device and the decrypted first key-exchange public key, and establishes a secure connection to the second device by using the shared key.

Further, when the first public key estimated value is inconsistent with the second public key estimated value obtained in step S306, the first device determines that the decrypted first key-exchange public key is incorrect. Therefore, the second device is not trustworthy, and a secure connection cannot be established between the first device and the second device.

Further, this embodiment may further include steps S308-S309, so that the first device proves to the second device, that the first device has a correct key-exchange private key and an asymmetric encryption private key and can generate a shared key.

S308. The first device generates first verification information.

The first verification information is a first encryption value obtained after the first device encrypts first designated information by using the shared key generated in step S307, or is a first hash value obtained after a hash operation is performed by using the shared key generated in step S307 in combination with first designated information, namely, a hash operation message authentication code (HMAC, Hash-based Message Authentication Code), or is a signature generated after first designated information is encrypted by using the asymmetric encryption private key, where the first designated information is information that is pre-agreed upon by the first device and the second device.

In this step, the first designated information is information pre-agreed upon and known by the first device and the second device, for example, a public key estimated value, message content (all or some content of a message exchanged between the first device and the second device), a hash operation value of message content, or some plaintexts.

S309. Send the first verification information obtained in step S308 to the second device.

The first verification information is used by the second device to verify, according to the received first verification information, whether the first device is trusted.

Specifically, when the first verification information is the first encryption value, the second device decrypts the first encryption value by using the shared key generated by the second device, and determines, according to whether the first designated information obtained after decryption is correct, whether the generated shared key is available;

when the first verification information is the first hash value, the second device performs a hash operation by using the shared key generated by the second device in combination with the first designated information, and determines, according to whether a hash value obtained by the second device matches the first hash value, whether the generated shared key is available; or when the first verification information is the signature, the second device decrypts the signature by using the asymmetric encryption public key, and determines, according to whether the first designated information obtained after decryption is correct, whether the first device is trusted.

Further, in a key exchange encryption process, if the two devices can both obtain a correct key-exchange public key of the peer and their own key-exchange private keys, they can obtain a same shared key by using the key-exchange public key of the peer and their own key-exchange private keys and corresponding key exchange algorithms. When the first verification information is the first encryption value, if the first device encrypts the first designated information by using the shared key generated by the first device, the second device can decrypt the first designated information by using the shared key generated by the second device. Therefore, in this step, when the first designated information obtained through decryption is correct information pre-agreed upon by the first device and the second device, it is determined that the generated shared key is available; when the obtained first designated information is different from the information pre-agreed upon by the first device and the second device, it is considered that the connection between the first device and the second device has a potential security risk, and it is determined that the generated shared key is unavailable.

Likewise, when the first verification information is the first hash value, and when the second device performs a hash operation by using the shared key generated by the second device and using a hash algorithm same as that of the first device in combination with the first designated information, an obtained hash value should match the first hash value. Therefore, in this step, when the obtained hash value matches the received first hash value, it is determined that the generated shared key is available; otherwise, it is considered that the connection between the first device and the second device has a potential security risk, and it is determined that the generated shared key is unavailable; or when the first verification information is the signature, the second device may decrypt the signature by using the asymmetric encryption public key to obtain a hash value, and determine whether the hash value is a hash value of the first designated information, and if yes, determine that the first device is trusted, or otherwise, determine that the first device is untrusted.

Further, in this step, the first verification information obtained in step S308 is sent to the second device, and a generation manner of the first verification information may also be sent to the second device. In specific implementation, the generation manner may be sent before or after the first verification information is sent, or the generation manner may be carried in a same data packet in which the first verification information is sent.

Further, this embodiment may further include S310-S314, so that the second device proves to the first device, that the second device has a correct key-exchange private key and can generate a shared key.

S310. The first device receives encrypted second verification information sent by the second device.

The second verification information is a second encryption value obtained after second designated information is encrypted by using the generated shared key after the shared key is generated by the second device, or is a second hash value obtained after a hash operation is performed by using the generated shared key in combination with second designated information, where the second designated information is information that is pre-agreed upon by the first device and the second device.

In this step, the second designated information is information pre-agreed upon and known by the first device and the second device, for example, a public key estimated value, message content (all or some content of a message exchanged between the first device and the second device), a hash operation value of message content, and some plaintexts. The second designated information may be the same as or different from the first designated information.

Further, there is no strict sequence between execution of this step and execution of steps S304-S309.

S311. When the second verification information is a second encryption value, decrypt the second encryption value by using the shared key generated by the first device.

S312. Determine, according to whether second designated information obtained through decryption in step S311 is correct, whether the generated shared key is available.

In this step, when the obtained second designated information is correct, it is determined that the generated shared key is available; when the obtained second designated information is incorrect, it is considered that the connection between the first device and the second device has a potential security risk, and it is determined that the generated shared key is unavailable.

S313. When the second verification information is a second hash value, perform a hash operation by using the shared key generated by the first device in combination with the second designated information.

S314. Determine, according to whether a hash value obtained by the first device in step S313 matches the second hash value, whether the generated shared key is available.

According to an actual situation, steps S311-S312 or S313-S314 may be selected for execution.

In this step, when the hash value obtained by the first device matches the second hash value, it is determined that the generated shared key is available; when the hash value obtained by the first device does not match the second hash value, it is considered that the connection between the first device and the second device has a potential security risk, and it is determined that the generated shared key is unavailable.

Further, there is no strict sequence between execution of steps S310-S314 and execution of steps S308-S309.

In an embodiment of the present invention, steps S310-S314 and/or steps S308-S309 may be included.

Embodiment 2

Figure 4:
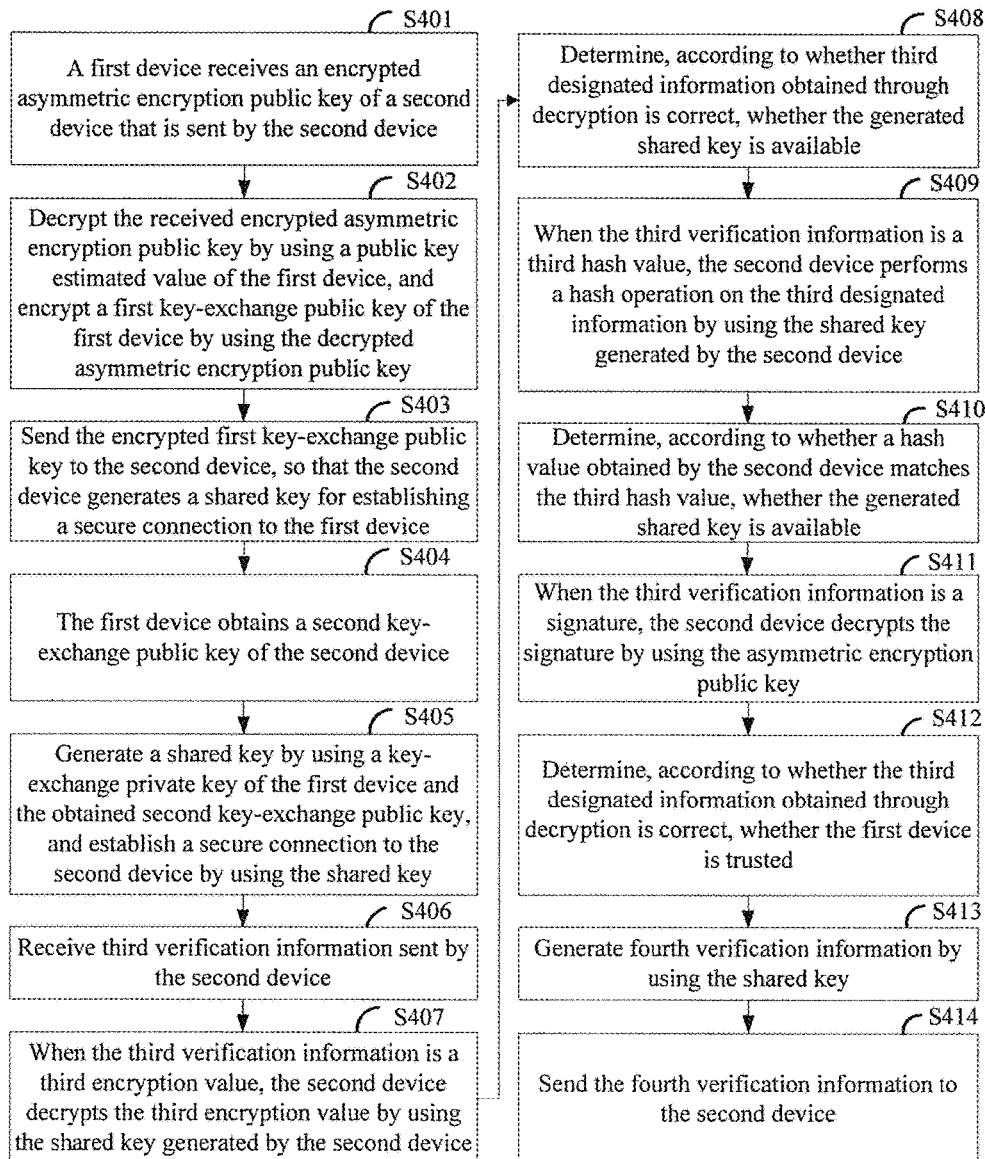
FIG. 4 is a flowchart of a method for establishing a secure connection according to Embodiment 2 of the present invention.

Embodiment 2 of the present invention provides a method for establishing a secure connection. The method is applied to a device corresponding to a device to which Embodiment 1 is applied. That is, if Embodiment 1 is applied to a registrar device, Embodiment 2 may be applied to an enrollee device; if Embodiment 1 is applied to an enrollee device, Embodiment 2 may be applied to a registrar device. As shown in FIG. 4, the method specifically includes the following steps:

S401. A first device receives an encrypted asymmetric encryption public key of a second device that is sent by the second device.

S402. The first device decrypts the received encrypted asymmetric encryption public key by using a public key estimated value of the first device, and encrypts a first key-exchange public key of the first device by using the decrypted asymmetric encryption public key.

The public key estimated value of the first device is obtained after an operation is performed based on the first key-exchange public key of the first device by using a preset algorithm.

S403. The first device sends the encrypted first key-exchange public key to the second device, so that the second device generates a shared key for establishing a secure connection to the first device.

S404. The first device obtains a second key-exchange public key of the second device.

This step may be specifically implemented as follows:

Step 1: The first device receives second key-exchange public key information sent by the second device.

The second key-exchange public key information is the plaintext second key-exchange public key or the second key-exchange public key encrypted by using the public key estimated value of the first device.

Step 2: When the received second key-exchange public key information is the encrypted second key-exchange public key, decrypt the encrypted second key-exchange public key by using the public key estimated value of the first device, to obtain the decrypted second key-exchange public key.

Further, the second key-exchange public key may be sent before or after the second device sends the asymmetric encryption public key, or may be sent in a same data packet in which the asymmetric encryption public key is sent.

Further, the second key-exchange public key information may be the plaintext second key-exchange public key or the second key-exchange public key encrypted by using the public key estimated value; when the second key-exchange public key information is the second key-exchange public key encrypted by using the public key estimated value, before the first device generates a shared key, the method further includes: decrypting the encrypted second key-exchange public key by using the public key estimated value of the first device.

S405. The first device generates a shared key by using a key-exchange private key of the first device and the obtained second key-exchange public key, and establishes a secure connection to the second device by using the shared key.

Further, there is no strict sequence between execution of steps S404-S405 and execution of steps S401-S403.

Further, this embodiment may further include steps S406-S412, so that the second device proves to the first device, that the second device has a correct key-exchange private key and can generate a shared key.

S406. The first device receives third verification information sent by the second device.

The third verification information is a third encryption value obtained by the second device after third designated information is encrypted by using the generated shared key, or is a third hash value obtained after a hash operation is performed on third designated information by using the generated shared key, or is a signature generated after third designated information is encrypted by using an asymmetric encryption private key, where the third designated information is information that is pre-agreed upon by the first device and the second device.

In this step, the third designated information is information pre-agreed upon and known by the first device and the second device, for example, a public key estimated value, message content (all or some content of a message exchanged between the first device and the second device), and some plaintexts.

Further, there is no strict sequence between execution of this step and execution of steps S404-S405.

S407. When the third verification information is a third encryption value, the first device decrypts the third encryption value by using the shared key generated by the first device.

S408. Determine, according to whether third designated information obtained through decryption in step S407 is correct, whether the generated shared key is available.

Further, in this step, when the obtained third designated information is correct, it is determined that the generated shared key is available; when the obtained third designated information is incorrect, it is determined that the generated shared key is unavailable.

S409. When the third verification information is a third hash value, the first device performs a hash operation on the third designated information by using the shared key generated by the first device, to obtain a hash value.

S410. Determine, according to whether the hash value obtained by the first device in step S409 matches the third hash value, whether the generated shared key is available.

Further, in this step, when the hash value obtained by the first device matches the third hash value, it is determined that the generated shared key is available; when the hash value obtained by the first device does not match the third hash value, it is determined that the generated shared key is unavailable.

S411. When the third verification information is a signature, the first device decrypts the signature by using the asymmetric encryption public key.

S412. Determine, according to whether the third designated information obtained through decryption in step S411 is correct, whether the second device is trusted.

Further, in this step, when the third designated information obtained through decryption is correct, it is determined that the second device is trusted; when the third designated information obtained through decryption is incorrect, it is determined that the second device is untrusted.

Further, after the first device generates the shared key, this embodiment may further include steps S413-S414, so that the first device proves to the second device, that the first device has a correct key-exchange private key and can generate a shared key.

S413. The first device generates fourth verification information by using the shared key generated in step S405.

The fourth verification information is a fourth encryption value obtained by the first device after fourth designated information is encrypted by using the generated shared key, or is a fourth hash value obtained after a hash operation is performed on fourth designated information by using the generated shared key, where the fourth designated information is information that is pre-agreed upon by the first device and the second device.

S414. Send the fourth verification information obtained in step S413 to the second device.

The fourth verification information is used by the second device to verify, according to the received fourth verification information, whether the first device is trusted.

Specifically, when the fourth verification information is the fourth encryption value, the second device decrypts the fourth encryption value by using the shared key generated by the second device, and determines, according to whether the fourth designated information obtained after decryption is correct, whether the generated shared key is available;

when the fourth verification information is the fourth hash value, the second device performs a hash operation by using the shared key generated by the second device, and determines, according to whether a hash value obtained by the second device matches the fourth hash value, whether the generated shared key is available.

Further, the fourth designated information is information pre-agreed upon and known by the first device and the second device, for example, a public key estimated value, message content (all or some content of a message exchanged between the first device and the second device), and some plaintexts. The fourth designated information may be the same as or different from the third designated information.

Embodiment 3

Figure 5:
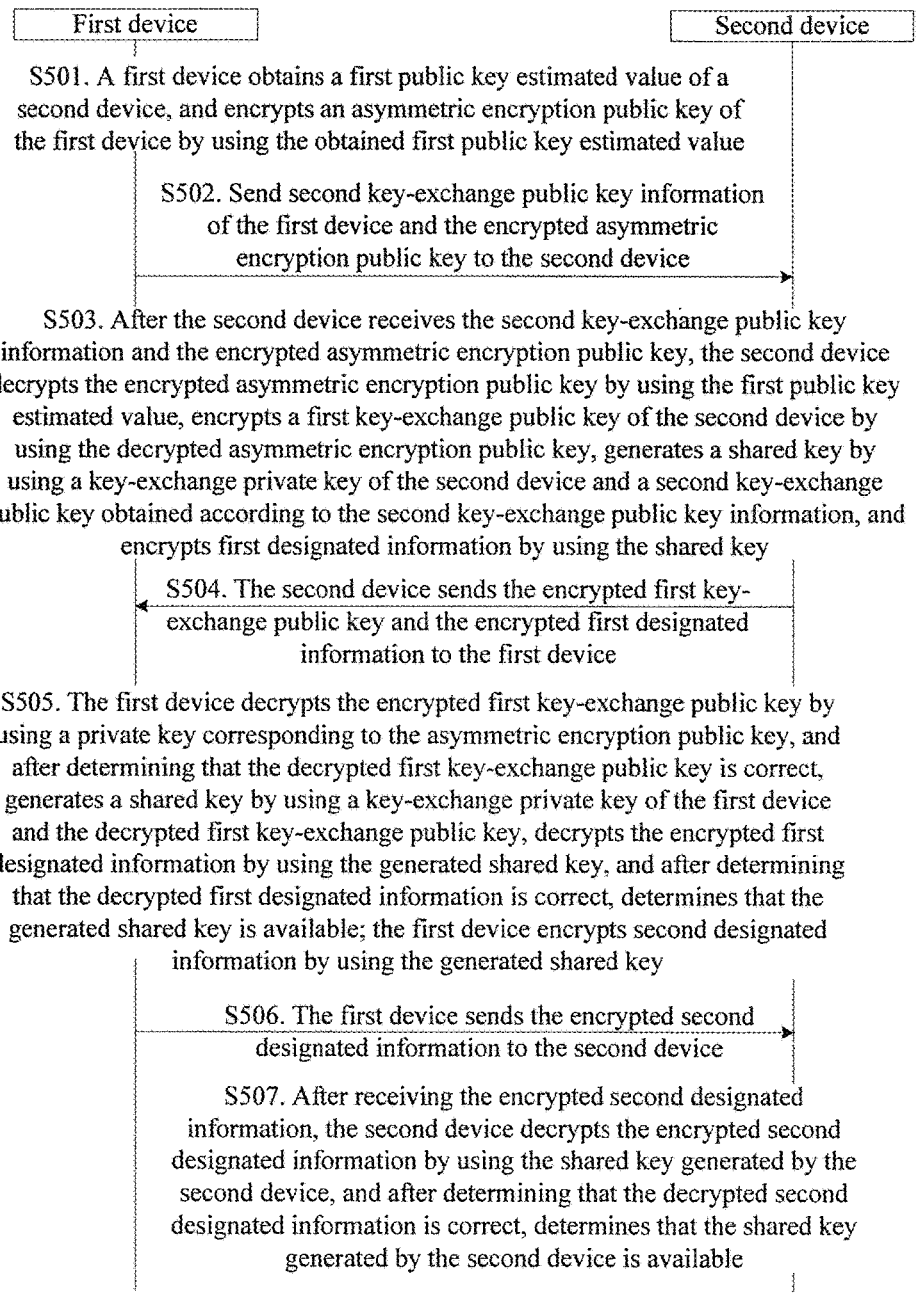
FIG. 5 is a flowchart of a method for establishing a secure connection according to Embodiment 3 of the present invention.

Embodiment 3 of the present invention provides a method for establishing a secure connection. The method is applied to a registrar device or an enrollee device. When a first device is a registrar device, a second device is an enrollee device, or vice versa. As shown in FIG. 5, the method specifically includes the following steps:

S501. The first device securely obtains a first public key estimated value of the second device in an out-of-band manner, and encrypts an asymmetric encryption public key of the first device by using the obtained first public key estimated value.

S502. Send second key-exchange public key information of the first device and the encrypted asymmetric encryption public key of the first device to the second device.

A second key-exchange public key is used by the second device to generate a shared key by using a key-exchange private key of the second device and the second key-exchange public key obtained according to the second key-exchange public key information, where the second key-exchange public key information is plaintext second key-exchange public key information, or is a second key-exchange public key encrypted by using the first public key estimated value.

S503. After the second device receives the second key-exchange public key information and the encrypted asymmetric encryption public key of the first device, the second device decrypts the encrypted asymmetric encryption public key of the first device by using the first public key estimated value, encrypts a first key-exchange public key of the second device by using the decrypted asymmetric encryption public key of the first device, generates a shared key by using a key-exchange private key of the second device and a second key-exchange public key obtained according to the second key-exchange public key information, and encrypts first designated information by using the shared key.

S504. The second device sends the encrypted first key-exchange public key and the encrypted first designated information to the first device.

S505. After the first device receives the encrypted first key-exchange public key sent by the second device and the encrypted first designated information, the first device decrypts the encrypted first key-exchange public key by using a private key corresponding to the asymmetric encryption public key, and after determining that the decrypted first key-exchange public key is correct, generates a shared key by using a key-exchange private key of the first device and the decrypted first key-exchange public key, decrypts the encrypted first designated information by using the generated shared key, and after determining that the decrypted first designated information is correct, determines that the generated shared key is available; the first device encrypts second designated information by using the generated shared key.

S506. The first device sends the encrypted second designated information to the second device.

Further, the second designated information may be the same as or different from the first designated information.

S507. After receiving the encrypted second designated information, the second device decrypts the encrypted second designated information by using the shared key generated by the second device, and after determining that the decrypted second designated information is correct, determines that the shared key generated by the second device is available.

Embodiment 4

Embodiment 4 of the present invention provides an access method for a WLAN user, where the access method is based on a method for establishing a secure connection according to an embodiment of the present invention.

An overall access procedure for a WLAN user may mainly include a device discovery process, a configuration process, and a 4-way handshake process. The device discovery process may be an active discovery process (for example, a user actively connects to an access point), or a passive discovery process. For example, in the passive discovery process, if one of a first device and a second device is an access point AP, a broadcast message (for example, a beacon message) may carry a WiFi simple configuration information element (WSC IE, WiFi simple configuration information element) used for the discovery process.

The configuration process may be implemented through Extensible Authentication Protocol (EAP, Extensible Authentication Protocol) encapsulation. EAP is a widely used authentication framework protocol that supports multiple authentication methods. The configuration process may be completed by encapsulating message content in an EAP request message and an EAP response message sent between two devices in the method for establishing a secure connection according to the embodiment of the present invention, so that the two devices obtain credentials (for example, shared keys generated by the two devices).

Figure 6A:
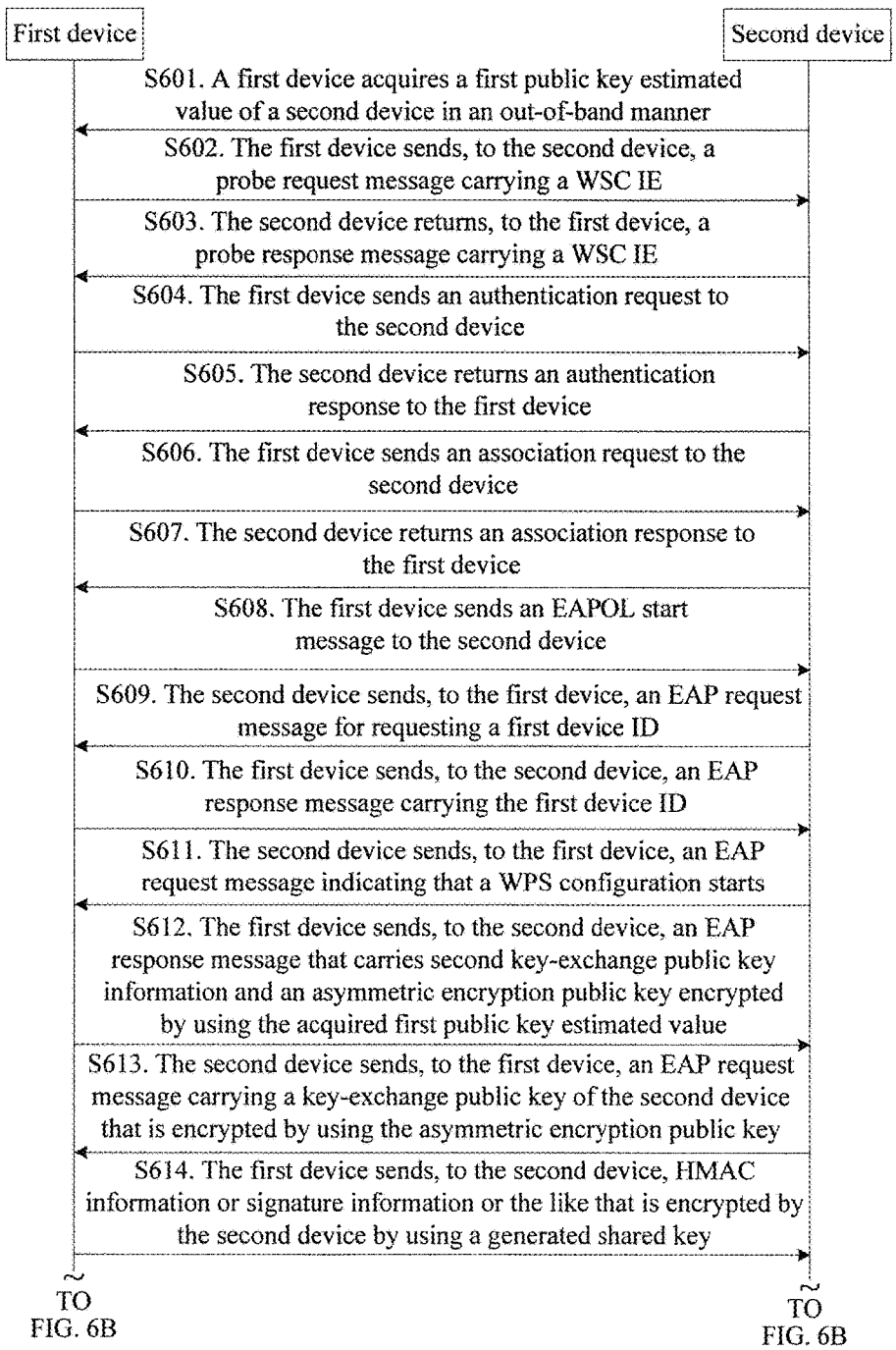
FIG. 6A and FIG. 6B are a flowchart of an access method for a WLAN user according to Embodiment 4 of the present invention.
Figure 6B:
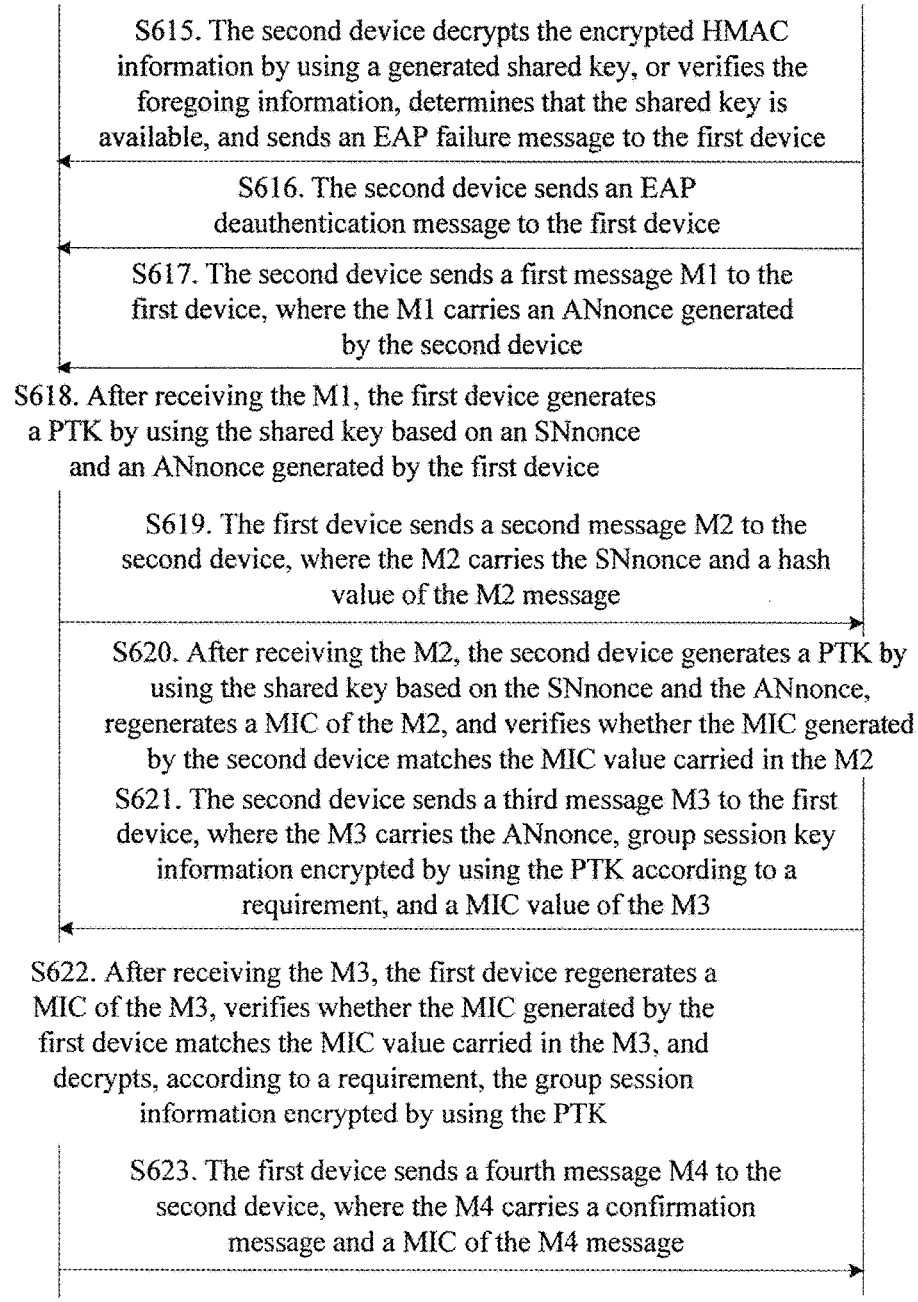

The following uses the active discovery process as an example. The access method for a WLAN user according to the embodiment of the present invention is shown in FIG. 6A for a WLAN user according to the embodiment of the present invention is shown in FIG. 6A and FIG. 6B, and specifically includes the following steps:

Steps S601-S607 are a device discovery process of the first device and the second device.

S601. The first device securely acquires a first public key estimated value of the second device in an out-of-band manner.

S602. The first device sends, to the second device, a probe request (probe request) message carrying a WSC IE.

In this step, the probe request message may carry a configuration manner to be used in a subsequent configuration process.

S603. The second device returns, to the first device, a probe response (probe response) message carrying a WSC IE.

In this step, when the probe request message in step S602 carries the configuration manner to be used in the subsequent configuration process, the probe response message may carry confirmation of the configuration manner.

S604. The first device sends an authentication request to the second device.

S605. The second device returns an authentication response to the first device.

S606. The first device sends an association request to the second device.

S607. The second device returns an association response to the first device.

Steps S608-S614 are a configuration process between the first device and the second device:

S608. The first device sends an Extensible Authentication Protocol over local area network (EAPoL, Extensible Authentication Protocol over LAN) start message to the second device.

S609. The second device sends, to the first device, an EAP request message for requesting a first device ID (Identification).

S610. The first device sends, to the second device, an EAP response message carrying the first device ID.

S611. The second device sends, to the first device, an EAP request message indicating that a WPS configuration starts.

S612. The first device sends, to the second device, an EAP response message that carries second key-exchange public key information of the first device and an asymmetric encryption public key of the first device that is encrypted by using the acquired first public key estimated value of the second device.

S613. The second device sends, to the first device, an EAP request message carrying a first key-exchange public key of the second device that is encrypted by using the asymmetric encryption public key of the first device. For this step, reference may be made to the related part in step S503.

S614. The first device receives the encrypted first key-exchange public key sent by the second device, decrypts the encrypted first key-exchange public key by using an asymmetric encryption private key corresponding to the asymmetric encryption public key, and after determining that the decrypted first key-exchange public key is correct, generates a shared key by using a key-exchange private key of the first device and the decrypted first key-exchange public key, and sends, to the second device, HMAC information or signature information or the like that is encrypted by the first device by using the generated shared key.

S615. The second device decrypts the encrypted HMAC information by using a shared key generated by the second device, or after verifying the foregoing information, determines that the shared key generated by the second device is available, and sends an EAP failure message to the first device.

S616. The second device sends an EAP deauthentication message to the first device.

Further, after step S616 is performed, the configuration process between the first device and the second device is complete, and shared keys of the two devices are generated. After both the first device and the second device generate correct shared keys (for example, DH keys), the two devices may determine that a secure network connection is established based on the shared keys.

Further, the process in this embodiment is not a real EAP process, but is intended to complete exchange of WPS authentication messages by using an EAP encapsulation format. Therefore, in step S615, after the second device determines that the shared key generated by the second device is available, the second device sends an EAP failure message to the first device, which actually indicates success of the WPS authentication in this embodiment. However, if the second device determines that the authentication fails, the second device does not send the EAP authentication failure message to the first device. Likewise, in step S616, the EAP deauthentication message also indicates success of the WPS authentication.

Further, the shared key may be used as a pairwise master key (PMK, Pairwise Master Key) in the subsequent 4-way handshake, or derivative information of the shared key may be generated, that is, a network configuration is performed between devices by using the shared key, and new connection information is obtained and used as a PMK in the subsequent 4-way handshake. For example, a new connection key is encrypted by using the shared key and sent to the peer, or a mapped value of the shared key is used as a connection key (for example, a hash value of the shared key, or a hash value of the shared key in combination with designated information), or a part of the shared key is used as the connection key. Further, a process of generating derivative information of the shared key needs to be performed according to a device type, for example, device information such as a type of the device (an AP, a sensor, a common device, or the like), and a role of the device (a registrar Registrar/enrollee enrollee, a group owner Group owner/client client, or the like). The first device and the second device may determine, according to the device type information and the device role information, whether to generate a connection key and send the connection key to the peer, or wait for receiving a connection key sent by the peer.

Further, roles in the 4-way handshake may include: an authenticator (Authenticator) and a supplicant (Supplicant). Generally, an AP device may be used as an Authenticator, and a registrar Registrar may be used as an authenticator, and an enrollee may be used as a supplicant. For a P2P device, a group owner GO device may be used as an authenticator, and a client client may be used as a supplicant. Therefore, before the 4-way handshake is performed, the first device and the second device need to acquire role information of the peer. For example, in step S601, the first device may determine, when acquiring the public key estimated value of the second device in the out-of-band manner and acquiring the role AP of the second device, that the first device needs to wait for a connection key sent by the peer (second device).

It is assumed that the role of the first device is a supplicant, and that the role of the second device is an authenticator, and that a shared key generated in the configuration process is used as a PMK. Steps S617-S623 are a 4-way handshake process after the first device and the second device obtain credentials (for example, the shared key or derivative information of the shared key).

S617. The second device sends a first message M1 to the first device, where the M1 carries an ANnonce generated by the second device.

S618. After receiving the M1, the first device generates a pairwise transient key (PTK, Pair Transient Key) by using the shared key based on an SNnonce and an ANnonce generated by the first device.

S619. The first device sends a second message M2 to the second device, where the M2 carries the SNnonce and a hash value of the M2 message (for example, a message integrity code (MIC, Message Integrality Code)).
code (MIC, Message Integrality Code)).

S620. After receiving the M2, the second device generates a PTK by using the shared key based on the SNnonce and the ANnonce, regenerates a MIC of the M2, and verifies whether the MIC generated by the second device matches the MIC value carried in the M2.

S621. The second device sends a third message M3 to the first device, where the M3 carries the ANnonce, group session key information encrypted by using the PTK according to a requirement, and a MIC value of the M3.

S622. After receiving the M3, the first device regenerates a MIC of the M3, verifies whether the MIC generated by the first device matches the MIC value carried in the M3, and decrypts, according to a requirement, the group session key information encrypted by using the PTK.

S623. The first device sends a fourth message M4 to the second device, where the M4 carries a confirmation message and a MIC of the M4 message.

Embodiment 5

Figure 7A:
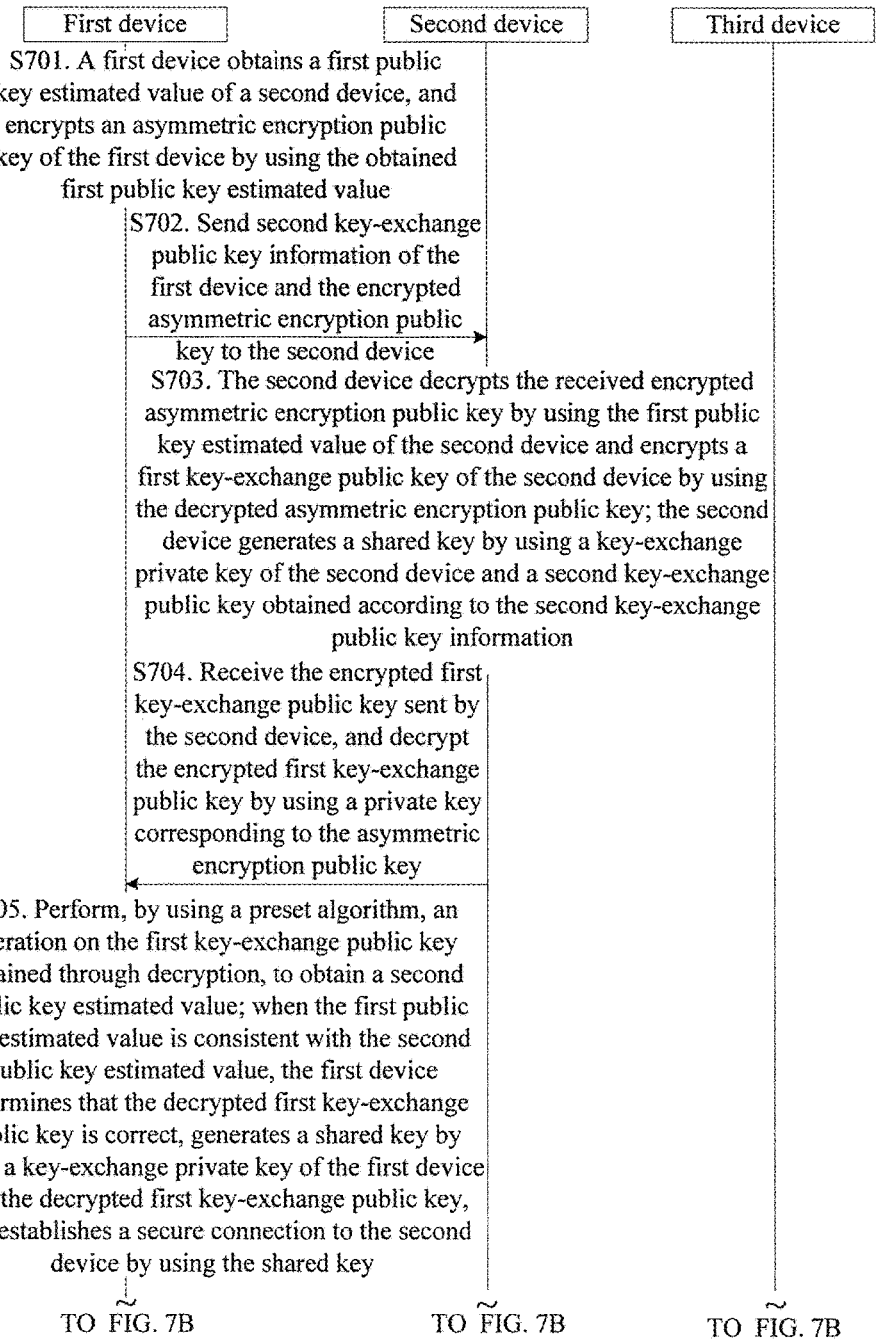

Embodiment 5 of the present invention provides a method for establishing a secure connection. The method for establishing a secure connection according to Embodiment 5 of the present invention may be applied to the following scenario: A second device and a third device do not establish a trust relationship with each other, and neither of them can obtain a public key estimated value of the peer in a direct manner. A trusted first device (for example, a configurator) needs to be used to assist the second device and the third device in completing configurations. For example, neither of the second device and the third device has a man-machine interface for inputting information of the peer; in this case, the first device may obtain a public key estimated value of the second device and a public key estimated value of the third device; the first device and the second device complete configurations by using the method for establishing a secure connection according to any one of the embodiments of the present invention, so that the two devices trust each other; the first device then sends the public key estimated value of the third device to the second device; the second device and the third device complete configurations by using the method for establishing a secure connection according to any one of the embodiments of the present invention. As shown in FIG. 7A and FIG. 7B, the method specifically includes the following steps:

S701. The first device securely obtains a first public key estimated value of the second device in an out-of-band manner, and encrypts an asymmetric encryption public key of the first device by using the obtained first public key estimated value.

The first public key estimated value is obtained after an operation is performed based on a first key-exchange public key of the second device by using a preset algorithm.

S702. The first device sends second key-exchange public key information of the first device and the encrypted asymmetric encryption public key of the first device to the second device.

S703. The second device decrypts the received encrypted asymmetric encryption public key of the first device by using the first public key estimated value of the second device and encrypts the first key-exchange public key of the second device by using the decrypted asymmetric encryption public key of the first device; the second device generates a shared key by using a key-exchange private key of the second device and a second key-exchange public key obtained according to the second key-exchange public key information.

S704. The first device receives the encrypted first key-exchange public key of the second device that is sent by the second device, and decrypts the encrypted first key-exchange public key of the second device by using an asymmetric encryption private key corresponding to the asymmetric encryption public key of the first device.

S705. The first device performs, by using a preset algorithm, an operation based on the first key-exchange public key of the second device that is obtained through decryption, to obtain a second public key estimated value; when the first public key estimated value is consistent with the second public key estimated value, the first device determines that the decrypted first key-exchange public key is correct, generates a shared key by using a key-exchange private key of the first device and the decrypted first key-exchange public key, and establishes a secure connection to the second device by using the shared key.

S706. The first device securely obtains a third public key estimated value of the third device in an out-of-band manner.

In this step, the first device may securely obtain the third public key estimated value of the third device in the out-of-band manner. In addition, there is no strict sequence between execution of the step of acquiring the third public key estimated value of the third device and execution of steps S701-S705.

S707. The first device encrypts the third public key estimated value of the third device obtained in step S706 and sends the encrypted third public key estimated value to the second device.

The public key estimated value of the third device is obtained after an operation is performed based on a key-exchange public key of the third device by using a preset algorithm; the public key estimated value of the third device is used by the second device to establish a secure connection to the third device based on the public key estimated value of the third device.

In this step, because the secure connection between the first device and the second device is established in the foregoing step, the first device and the second device can trust each other. Therefore, the third public key estimated value of the third device that is sent by the first device to the second device is trusted by the second device, and the second device may establish a secure connection to the third device based on the third public key estimated value.

S708. After the second device receives the encrypted third public key estimated value of the third device that is sent by the first device, the second device decrypts the received encrypted third public key estimated value, and encrypts an asymmetric encryption public key of the second device by using the decrypted third public key estimated value.

S709. The second device sends first key-exchange public key information of the second device and the encrypted asymmetric encryption public key of the second device to the third device.

S710. The third device decrypts the received encrypted asymmetric encryption public key by using the third public key estimated value of the third device, encrypts a third key-exchange public key of the third device by using the decrypted asymmetric encryption public key, and generates a shared key by using a key-exchange private key of the third device and the first key-exchange public key obtained according to the first key-exchange public key information.

S711. The second device receives the encrypted third key-exchange public key sent by the third device, and decrypts the encrypted third key-exchange public key by using a private key corresponding to the asymmetric encryption public key of the second device.

S712. The second device performs, by using the preset algorithm, an operation based on the third key-exchange public key obtained through decryption, to obtain a fourth public key estimated value; when the third public key estimated value is consistent with the fourth public key estimated value, the second device determines that the decrypted third key-exchange public key is correct, generates a shared key by using the key-exchange private key of the second device and the decrypted third key-exchange public key, and establishes a secure connection to the third device by using the shared key.

Further, in this embodiment, both the configuration process between the first device and the second device and the configuration process between the third device and the second device may be configured by using the method for establishing a secure connection according to any one of Embodiment 1 to Embodiment 3 provided by the present invention or according to any combination of features in any one of Embodiment 1 to Embodiment 3.

Embodiment 6

Figure 8A:
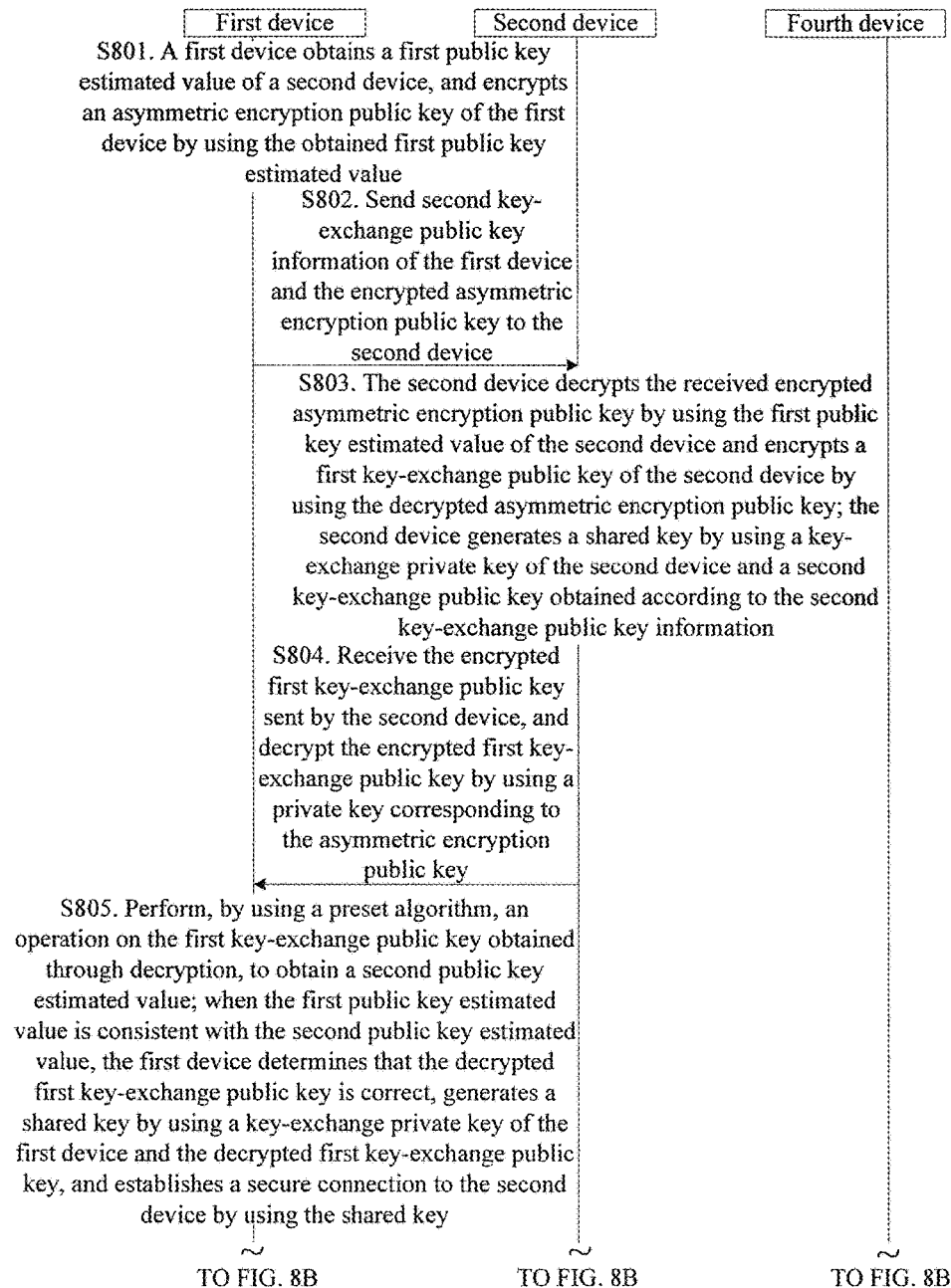

Embodiment 6 of the present invention provides a method for establishing a secure connection. The method for establishing a secure connection according to Embodiment 6 of the present invention may be applied to the following scenario: A second device and a fourth device do not establish a trust relationship with each other, and neither of them can obtain a public key estimated value of the peer in a direct manner. A trusted first device (for example, a configurator) needs to be used to assist the second device and the fourth device in completing configurations. For example, neither of the second device and the fourth device has a man-machine interface for inputting information of the peer; in this case, the first device may obtain a public key estimated value of the second device; the first device and the second device complete configurations by using the method for establishing a secure connection according to any one of the embodiments of the present invention and generate a shared key; the first device obtains a public key estimated value of the fourth device; the first device and the fourth device complete configurations by using the method for establishing a secure connection according to any one of the embodiments of the present invention and generate a shared key; the first device determines, according to shared keys generated with the second device and the fourth device, a shared key between the second device and the fourth device, so that the second device establishes a secure connection to the fourth device. As shown in FIG. 8A and FIG. 8B, the method specifically includes the following steps:

S801. The first device securely obtains a first public key estimated value of the second device in an out-of-band manner, and encrypts an asymmetric encryption public key of the first device by using the obtained first public key estimated value.

The first public key estimated value is obtained after an operation is performed based on a first key-exchange public key of the second device by using a preset algorithm.

S802. The first device sends second key-exchange public key information of the first device and the encrypted asymmetric encryption public key to the second device.

S803. The second device decrypts the received encrypted asymmetric encryption public key by using the first public key estimated value of the second device and encrypts a first key-exchange public key of the second device by using the decrypted asymmetric encryption public key; the second device generates a shared key by using a key-exchange private key of the second device and a second key-exchange public key obtained according to the second key-exchange public key information.

S804. The first device receives the encrypted first key-exchange public key sent by the second device, and decrypts the encrypted first key-exchange public key by using an asymmetric encryption private key corresponding to the asymmetric encryption public key of the first device.

S805. The first device performs, by using a preset algorithm, an operation based on the first key-exchange public key obtained through decryption, to obtain a second public key estimated value; when the first public key estimated value is consistent with the second public key estimated value, the first device determines that the decrypted first key-exchange public key is correct, generates a shared key by using a key-exchange private key of the first device and the decrypted first key-exchange public key, and establishes a secure connection to the second device by using the shared key.

S806. The first device securely obtains a third public key estimated value of the fourth device in an out-of-band manner, and encrypts the asymmetric encryption public key of the first device by using the obtained third public key estimated value.

The third public key estimated value of the fourth device is obtained after an operation is performed based on a third key-exchange public key of the fourth device by using a preset algorithm.

Further, the first device obtains the third public key estimated value of the fourth device in the out-of-band manner, and there is no strict sequence between execution of the step of obtaining the third public key estimated value of the fourth device and execution of steps S801-S805.

S807. The first device sends the second key-exchange public key information of the first device and the encrypted asymmetric encryption public key of the first device to the fourth device.

S808. The fourth device decrypts the received encrypted asymmetric encryption public key of the first device by using the third public key estimated value of the fourth device and encrypts a third key-exchange public key of the fourth device by using the decrypted asymmetric encryption public key; the fourth device generates a shared key by using a key-exchange private key of the fourth device and the second key-exchange public key obtained according to the second key-exchange public key information.

In this step, when the second key-exchange public key information is a plaintext second key-exchange public key, the fourth device generates the shared key by using the second key-exchange public key and the key-exchange private key of the fourth device; when the second key-exchange public key information is an encrypted second key-exchange public key, the fourth device first performs decryption by using the third public key estimated value of the fourth device, to obtain the second key-exchange public key, and then generates the shared key by using the key-exchange private key of the fourth device.

S809. The first device receives the encrypted third key-exchange public key sent by the fourth device, and decrypts the encrypted third key-exchange public key by using a private key corresponding to the asymmetric encryption public key of the first device.

S810. The first device performs, by using the preset algorithm, an operation based on the third key-exchange public key obtained through decryption, to obtain a fourth public key estimated value; when the third public key estimated value is consistent with the fourth public key estimated value, the first device determines that the decrypted third key-exchange public key is correct, generates a shared key by using the key-exchange private key of the first device and the decrypted third key-exchange public key, and establishes a secure connection to the fourth device by using the shared key.

S811. After the first device establishes the secure connection to the second device and the first device establishes the secure connection to the fourth device, the first device determines, based on the shared key generated with the second device and the shared key generated with the fourth device, connection information for establishing a secure connection between the second device and the fourth device.

In this step, the connection information may be the shared key generated between the first device and the second device or between the first device and the fourth device, or may be derivative information of the generated shared key, for example, a new connection key encrypted by using the shared key, or a mapped value of the shared key is used as a connection key (for example, a hash value of the shared value or a hash value of the shared key in combination with designated information), or a part of the shared key is used as a connection key.

S812. The first device sends the determined connection information to the second device and the fourth device separately.

Further, in this embodiment, both the configuration process between the first device and the second device and the configuration process between the first device and the fourth device may be configured by using the method for establishing a secure connection according to any one of Embodiment 1 to Embodiment 3 provided by the present invention or according to any combination of features in any one of Embodiment 1 to Embodiment 3. Further, in the configuration process between the first device and the second device, a 4-way handshake process may be further performed directly using the obtained connection key, or a WPS process is performed by using the connection key.

Based on a same inventive idea, an embodiment of the present invention further provides a device and a system for establishing a secure connection. Principles of solving a problem by the device and system are similar to those of the foregoing method for establishing a secure connection. Therefore, for implementation of the device and system, reference may be made to implementation of the foregoing method. Duplicate parts are not further described herein.

Figure 9:
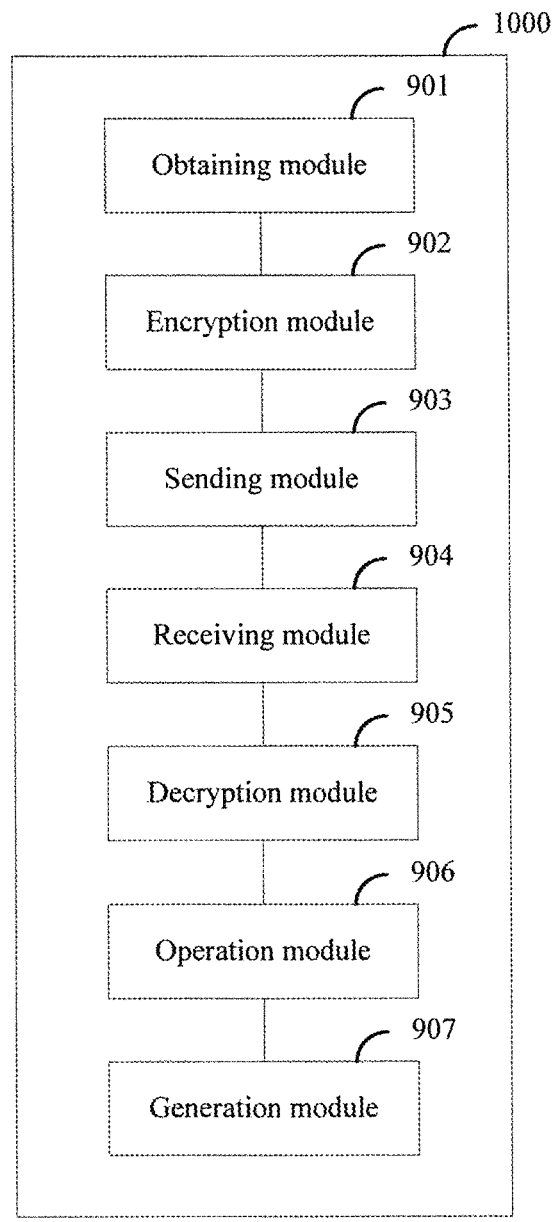
FIG. 9 is a schematic structural diagram of a device I for establishing a secure connection according to an embodiment of the present invention.

An embodiment of the present invention provides a device 11000 for establishing a secure connection. As shown in FIG. 9, the device includes:

an obtaining module 901, configured to securely obtain a first public key estimated value of a second device in an out-of-band manner, where the first public key estimated value is a value obtained after an operation is performed based on a first key-exchange public key of the second device by using a preset algorithm;

an encryption module 902, configured to encrypt an asymmetric encryption public key of the device by using the first public key estimated value obtained by the obtaining module 901;

a sending module 903, configured to send the asymmetric encryption public key encrypted by the encryption module 902 and second key-exchange public key information of the first device to the second device, where the second key-exchange public key information includes a second key-exchange public key of the first device, and the second key-exchange public key is used by the second device to generate a shared key by using the second key-exchange public key and a key-exchange private key of the second device and establish a secure connection to the first device by using the generated shared key;

a receiving module 904, configured to receive the encrypted first key-exchange public key of the second device that is sent by the second device, where the encrypted first key-exchange public key is obtained by the second device after the second device decrypts the received encrypted asymmetric encryption public key of the device by using the first public key estimated value of the second device and encrypts the first key-exchange public key by using the decrypted asymmetric encryption public key of the device;

a decryption module 905, configured to decrypt, by using an asymmetric encryption private key corresponding to the asymmetric encryption public key, the encrypted first key-exchange public key received by the receiving module 904;

an operation module 906, configured to perform, by using the preset algorithm, an operation based on the first key-exchange public key obtained by the decryption module 905 through decryption, to obtain a second public key estimated value; and a generation module 907, configured to: when the first public key estimated value is consistent with the second public key estimated value obtained by the operation module 906, determine that the decrypted first key-exchange public key is correct, generate a shared key by using a key-exchange private key of the device and the decrypted first key-exchange public key, and establish a secure connection to the second device by using the shared key.

Further, the generation module 907 is further configured to generate first verification information after generating the shared key, where the first verification information is a first encryption value obtained by the generation module 907 after first designated information is encrypted by using the generated shared key, or is a first hash value obtained by the generation module 907 after a hash operation is performed by using the generated shared key in combination with first designated information, or is a signature generated by the generation module 907 after first designated information is encrypted by using the asymmetric encryption private key, where the first designated information is information that is pre-agreed upon by the device and the second device; and the sending module 903 is further configured to send the first verification information generated by the generation module 907 to the second device, where the first verification information is used by the second device to verify, according to the received first verification information, whether the device is trusted.

Further, the receiving module 904 is further configured to receive second verification information sent by the second device, where the second verification information is a second encryption value obtained after second designated information is encrypted by using the generated shared key after the shared key is generated by the second device, or is a second hash value obtained after a hash operation is performed by using the generated shared key in combination with second designated information, where the second designated information is information that is pre-agreed upon by the device and the second device;

the decryption module 905 is further configured to: after the shared key is generated, when the second verification information received by the receiving module 904 is the second encryption value, decrypt the second encryption value by using the shared key generated by the generation module 907, and when the second verification information is the second hash value, perform a hash operation by using the shared key generated by the generation module 907 in combination with the second designated information; and the generation module 907 is further configured to determine, according to whether the second designated information obtained by the decryption module 905 after the second encryption value is decrypted is correct, whether the generated shared key is available, and determine, according to whether a hash value obtained by the decryption module 905 after the hash operation is performed on the second designated information matches the second hash value, whether the generated shared key is available.

Further, the obtaining module 901 is further configured to securely obtain a public key estimated value of a third device in an out-of-band manner after the device establishes the secure connection to the second device by using the shared key; and the sending module 903 is further configured to encrypt the public key estimated value of the third device that is obtained by the obtaining module 901, and send the encrypted public key estimated value of the third device to the second device, where the public key estimated value of the third device is used by the second device to establish a secure connection to the third device based on the public key estimated value of the third device.

Further, the obtaining module 901 is further configured to securely obtain a third public key estimated value of a fourth device in an out-of-band manner after the device establishes the secure connection to the second device by using the shared key;

the encryption module 902 is further configured to encrypt the asymmetric encryption public key of the device by using the third public key estimated value obtained by the obtaining module 901;

the sending module 903 is further configured to send the asymmetric encryption public key encrypted by the encryption module 902 to the fourth device;

the receiving module 904 is further configured to receive an encrypted third key-exchange public key of the fourth device that is sent by the fourth device, where the encrypted third key-exchange public key is obtained by the fourth device after the fourth device decrypts the received encrypted asymmetric encryption public key by using the third public key estimated value of the fourth device and encrypts the third key-exchange public key by using the decrypted asymmetric encryption public key;

the decryption module 905 is further configured to decrypt, by using a private key corresponding to the asymmetric encryption public key, the encrypted third key-exchange public key received by the receiving module 904;

the operation module 906 is further configured to perform, by using the preset algorithm, an operation based on the third key-exchange public key obtained through decryption, to obtain a fourth public key estimated value;

the generation module 907 is further configured to: when the third public key estimated value is consistent with the fourth public key estimated value obtained by the operation module 906, determine that the decrypted third key-exchange public key is correct, generate a shared key by using the key-exchange private key of the device and the decrypted third key-exchange public key, and establish a secure connection to the fourth device by using the shared key; and after the device establishes the secure connection to the second device and the device establishes the secure connection to the fourth device, determine, based on the shared key generated with the second device and the shared key generated with the fourth device, connection information for establishing a secure connection between the second device and the fourth device; and the sending module 903 is further configured to send the connection information determined by the generation module 907 to the second device and the fourth device separately.

Further, the second key-exchange public key information of the first device that is sent by the sending module 903 is the plaintext second key-exchange public key of the first device, or is the second key-exchange public key encrypted by using the first public key estimated value of the second device.

Figure 10:
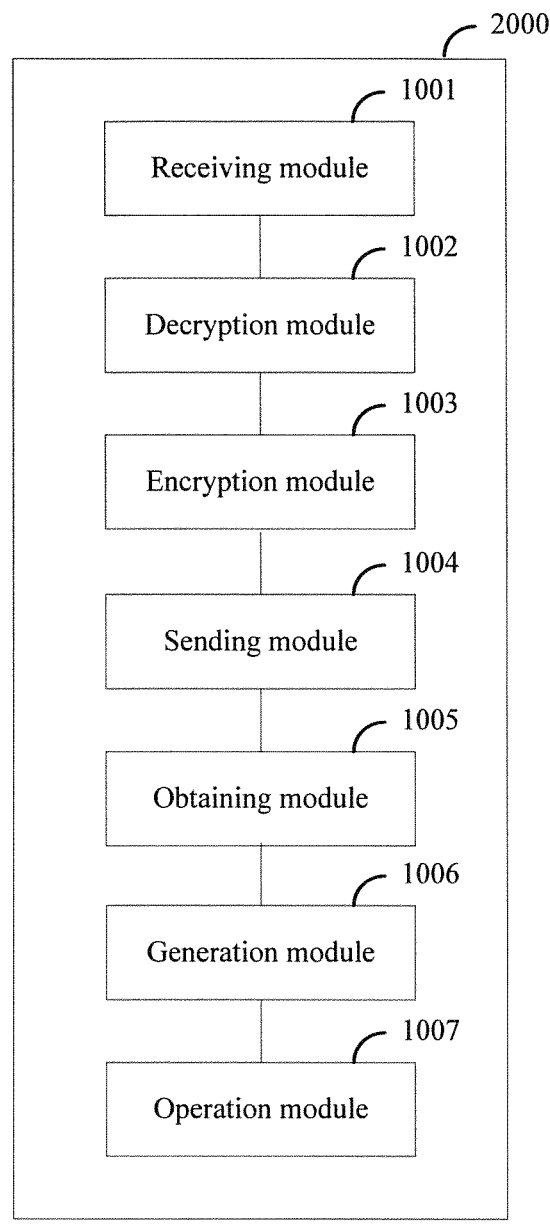
FIG. 10 is a schematic structural diagram of a device II for establishing a secure connection according to an embodiment of the present invention.

An embodiment of the present invention provides a device II 2000 for establishing a secure connection. As shown in FIG. 10, the device includes:

a receiving module 1001, configured to receive an encrypted asymmetric encryption public key of a second device that is sent by the second device, where the encrypted asymmetric encryption public key of the second device is encrypted by the second device by using a first public key estimated value of the device that is securely obtained in an out-of-band manner, and the first public key estimated value is a value obtained after an operation is performed based on a first key-exchange public key of the device by using a preset algorithm;

a decryption module 1002, configured to decrypt, by using the first public key estimated value of the device, the encrypted asymmetric encryption public key received by the receiving module 1001;

an encryption module 1003, configured to encrypt the first key-exchange public key of the device by using the asymmetric encryption public key decrypted by the decryption module 1002;

a sending module 1004, configured to send the first key-exchange public key encrypted by the encryption module 1003 to the second device, so that the second device decrypts the encrypted first key-exchange public key by using an asymmetric encryption private key corresponding to the asymmetric encryption public key and generates, by using the decrypted first key-exchange public key and a key-exchange private key of the second device, a shared key for establishing a secure connection to the device;

an obtaining module 1005, configured to obtain a second key-exchange public key of the second device; and a generation module 1006, configured to generate a shared key by using a key-exchange private key of the device and the second key-exchange public key obtained by the obtaining module 1005, and establish a secure connection to the second device by using the shared key.

Further, the receiving module 1001 is further configured to receive third verification information sent by the second device, where the third verification information is a third encryption value obtained by the second device after third designated information is encrypted by using the generated shared key, or is a third hash value obtained by the second device after a hash operation is performed on third designated information by using the generated shared key, or is a signature generated after third designated information is encrypted by the second device by using the asymmetric encryption private key, where the third designated information is information that is pre-agreed upon by the device and the second device;

the decryption module 1002 is further configured to: after the generation module 1006 generates the shared key, when the third verification information is the third encryption value, decrypt the third encryption value by using the shared key generated by the generation module 1006, and when the third verification information is the third hash value, perform a hash operation on the third designated information by using the shared key generated by the generation module 1006, and when the third verification information is the encrypted signature, decrypt the encrypted signature by using the asymmetric encryption public key; and the generation module 1006 is further configured to determine, according to whether the third designated information obtained by the decryption module 1002 after the third encryption value is decrypted is correct, whether the generated shared key is available, and determine, according to whether a hash value obtained by the decryption module 1002 after the hash operation is performed on the third designated information matches the third hash value, whether the generated shared key is available, and determine, according to whether the third designated information obtained by the decryption module 1002 after the encrypted signature is decrypted is correct, whether the second device is trusted.

Further, the generation module 1006 is further configured to generate fourth verification information by using the generated shared key after the shared key is generated, where the fourth verification information is a fourth encryption value obtained by the generation module 1006 after fourth designated information is encrypted by using the generated shared key, or is a fourth hash value obtained by the generation module 1006 after a hash operation is performed on fourth designated information by using the generated shared key, where the fourth designated information is information that is pre-agreed upon by the device and the second device; and the sending module 1004 is further configured to send the fourth verification information generated by the generation module 1006 to the second device, where the fourth verification information is used by the second device to verify, according to the received fourth verification information, whether the device is trusted.

Further, the obtaining module 1005 is specifically configured to receive second key-exchange public key information sent by the second device, where the second key-exchange public key information is the plaintext second key-exchange public key or the second key-exchange public key encrypted by using the public key estimated value of the device; and when the received second key-exchange public key information is the encrypted second key-exchange public key, decrypt the encrypted second key-exchange public key by using the public key estimated value of the device, to obtain the decrypted second key-exchange public key.

Further, the device further includes an operation module 1007, where:

the receiving module 1001 is further configured to receive, after the generation module 1006 establishes the secure connection to the second device by using the shared key, an encrypted third public key estimated value of a third device that is sent by the second device;

the decryption module 1002 is further configured to decrypt the encrypted third public key estimated value received by the receiving module 1001;

the encryption module 1003 is further configured to encrypt an asymmetric encryption public key of the device by using the third public key estimated value decrypted by the decryption module 1002;

the sending module 1004 is further configured to send the encrypted asymmetric encryption public key to the third device;

the receiving module 1001 is further configured to receive, after the sending module 1004 sends the encrypted asymmetric encryption public key to the third device, an encrypted third key-exchange public key sent by the third device, where the encrypted third key-exchange public key is obtained by the third device after the third device decrypts the received encrypted asymmetric encryption public key by using the third public key estimated value of the third device and encrypts the third key-exchange public key by using the decrypted asymmetric encryption public key;

the decryption module 1002 is further configured to decrypt, by using an asymmetric encryption private key corresponding to the asymmetric encryption public key, the encrypted third key-exchange public key received by the receiving module 1001;

the operation module 1007 is configured to perform, by using the preset algorithm, an operation based on the third key-exchange public key obtained by the decryption module 1002 through decryption, to obtain a fourth public key estimated value; and the generation module 1006 is further configured to: when the third public key estimated value is consistent with the fourth public key estimated value, determine that the decrypted third key-exchange public key is correct, generate a shared key by using the key-exchange private key of the device and the decrypted third key-exchange public key, and establish a secure connection to the third device by using the shared key.

An embodiment of the present invention provides a system for establishing a secure connection, where the system includes the foregoing device I and the foregoing device II.

Based on a same inventive idea, an embodiment of the present invention further provides a device and a system for establishing a secure connection. Principles of solving a problem by the device and system are similar to those of the foregoing method for establishing a secure connection. Therefore, for implementation of the device and system, reference may be made to implementation of the foregoing method. Duplicate parts are not further described herein.

Figure 11:
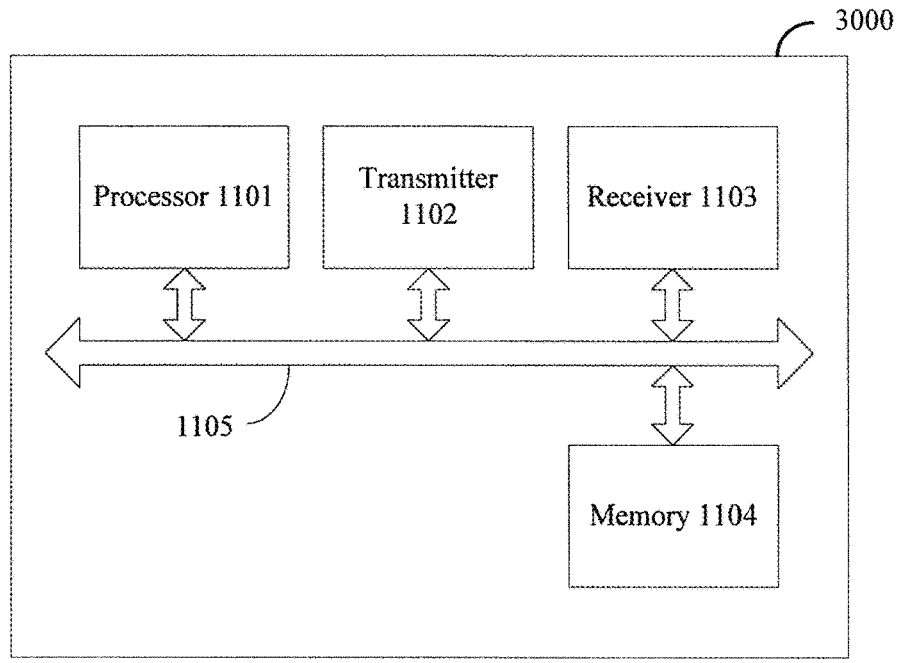
FIG. 11 is a schematic structural diagram of a device III for establishing a secure connection according to an embodiment of the present invention.

An embodiment of the present invention provides a device III 3000 for establishing a secure connection. As shown in FIG. 11, the device includes a processor 1101 (there may be one or more processors, and one processor is used as an example in each embodiment of the present invention), a transmitter 1102, a receiver 1103, a memory 1104, and a bus system 1105.

The processor 1101 controls an operation of the device III 3000 for establishing a secure connection. The processor 1101 may also be called a CPU (Central Processing Unit, central processing unit). The processor 1101 may be an integrated circuit chip and has a signal processing capability. The processor 1101 may be a general purpose processor, a digital signal processor (DSP, Digital Signal Processor), an application-specific integrated circuit (ASIC, Application Specific Integrated Circuit), a field programmable gate array (FPGA, Field Programmable Gate Array), or another programmable logical device, discrete gate or transistor logical device, or discrete hardware component. The general purpose processor may be a microprocessor or the processor may be any conventional processor and the like.

The memory 1104 may include a read-only memory and a random access memory, and provides an instruction and data to the processor 1101. A part of the memory 1104 may further include a non-volatile random access memory (NVRAM).

Components of the device III 3000 for establishing a secure connection are coupled together by using the bus system 1105. The bus system 1105 may further include a power bus, a control bus, a status signal bus, and the like, in addition to a data bus. The bus system may be an ISA (Industry Standard Architecture, industry standard architecture) bus, a PCI (Peripheral Component Interconnect, peripheral component interconnect) bus, an EISA (Extended Industry Standard Architecture, extended industry standard architecture) bus, or the like. The bus may be one or more physical lines. When the bus is multiple physical lines, the bus may be divided into an address bus, a data bus, a control bus, and the like. In other embodiments of the present invention, the processor 1101, memory 1104, receiver 1103, and transmitter 1102 may also be connected directly by using a communications line. However, for clear description, various buses in the figure are marked as the bus system 1105.

The memory 1104 stores the following elements, executable modules or data structures, or their subsets, or their extension sets:

operation instructions, including various operation instructions and used to implement various operations; and an operating system, including various system programs and used to implement various basic services and process hardware-based tasks.

In the embodiment of the present invention, by invoking an operation instruction stored in the memory 1104 (the operation instruction may be stored in the operating system), the processor 1101 performs the following operations:

The processor 1101 is configured to securely obtain a first public key estimated value of a second device in an out-of-band manner, where the first public key estimated value is a value obtained after an operation is performed based on a first key-exchange public key of the second device by using a preset algorithm, and encrypt an asymmetric encryption public key of the device by using the obtained first public key estimated value.

The transmitter 1102 is configured to send the asymmetric encryption public key encrypted by the processor 1101 and second key-exchange public key information of the first device to the second device, where the second key-exchange public key information includes a second key-exchange public key of the first device, and the second key-exchange public key is used by the second device to generate a shared key by using the second key-exchange public key and a key-exchange private key of the second device and establish a secure connection to the first device by using the generated shared key.

The receiver 1103 is configured to receive the encrypted first key-exchange public key of the second device that is sent by the second device, where the encrypted first key-exchange public key is obtained by the second device after the second device decrypts the received encrypted asymmetric encryption public key of the device by using the first public key estimated value of the second device and encrypts the first key-exchange public key by using the decrypted asymmetric encryption public key of the device.

The processor 1101 is further configured to decrypt, by using an asymmetric encryption private key corresponding to the asymmetric encryption public key, the encrypted first key-exchange public key received by the receiver 1103; perform, by using the preset algorithm, an operation based on the first key-exchange public key obtained through decryption, to obtain a second public key estimated value; and when the first public key estimated value is consistent with the second public key estimated value, determine that the decrypted first key-exchange public key is correct, generate a shared key by using a key-exchange private key of the device and the decrypted first key-exchange public key, and establish a secure connection to the second device by using the shared key.

Further, the processor 1101 is further configured to generate first verification information after generating the shared key, where the first verification information is a first encryption value obtained by the processor 1101 after first designated information is encrypted by using the generated shared key, or is a first hash value obtained by the processor 1101 after a hash operation is performed by using the generated shared key in combination with first designated information, or is a signature generated after first designated information is encrypted by the processor 1101 by using the asymmetric encryption private key, where the first designated information is information that is pre-agreed upon by the device and the second device; and the transmitter 1102 is further configured to send the first verification information generated by the processor 1101 to the second device, where the first verification information is used by the second device to verify, according to the received first verification information, whether the device is trusted.

Further, the receiver 1103 is further configured to receive second verification information sent by the second device, where the second verification information is a second encryption value obtained after second designated information is encrypted by using the generated shared key after the shared key is generated by the second device, or is a second hash value obtained after a hash operation is performed by using the generated shared key in combination with second designated information, where the second designated information is information that is pre-agreed upon by the device and the second device; and the processor 1101 is further configured to: after the shared key is generated, when the second verification information received by the receiver 1103 is the second encryption value, decrypt the second encryption value by using the shared key generated by the processor 1101; when the second verification information is the second hash value, perform a hash operation by using the shared key generated by the processor 1101 in combination with the second designated information; determine, according to whether the second designated information obtained after the second encryption value is decrypted is correct, whether the generated shared key is available; and determine, according to whether a hash value obtained by the processor 1101 after the hash operation is performed on the second designated information matches the second hash value, whether the generated shared key is available.

Further, the processor 1101 is further configured to obtain a public key estimated value of a third device after the device establishes the secure connection to the second device by using the shared key; and the transmitter 1102 is further configured to encrypt the public key estimated value of the third device that is securely obtained by the processor 1101 in an out-of-band manner, and send the encrypted public key estimated value of the third device to the second device, where the public key estimated value of the third device is used by the second device to establish a secure connection to the third device based on the public key estimated value of the third device.

Further, the processor 1101 is further configured to securely obtain a third public key estimated value of a fourth device in an out-of-band manner after the device establishes the secure connection to the second device by using the shared key, and encrypt the asymmetric encryption public key of the device by using the obtained third public key estimated value;

the transmitter 1102 is further configured to send the asymmetric encryption public key encrypted by the processor 1101 to the fourth device;

the receiver 1103 is further configured to receive an encrypted third key-exchange public key of the fourth device that is sent by the fourth device, where the encrypted third key-exchange public key is obtained by the fourth device after the fourth device decrypts the received encrypted asymmetric encryption public key by using the third public key estimated value of the fourth device and encrypts the third key-exchange public key by using the decrypted asymmetric encryption public key;

the processor 1101 is further configured to decrypt, by using a private key corresponding to the asymmetric encryption public key, the encrypted third key-exchange public key received by the receiver 1103; perform, by using the preset algorithm, an operation based on the third key-exchange public key obtained through decryption, to obtain a fourth public key estimated value; when the third public key estimated value is consistent with the fourth public key estimated value, determine that the decrypted third key-exchange public key is correct, generate a shared key by using the key-exchange private key of the device and the decrypted third key-exchange public key, and establish a secure connection to the fourth device by using the shared key; and after the device establishes the secure connection to the second device and the device establishes the secure connection to the fourth device, determine, based on the shared key generated with the second device and the shared key generated with the fourth device, connection information for establishing a secure connection between the second device and the fourth device; and the transmitter 1102 is further configured to send the connection information determined by the processor 1101 to the second device and the fourth device separately.

Further, the second key-exchange public key information of the first device that is sent by the transmitter 1102 is the plaintext second key-exchange public key of the first device, or is the second key-exchange public key encrypted by using the first public key estimated value of the second device.

Figure 12:
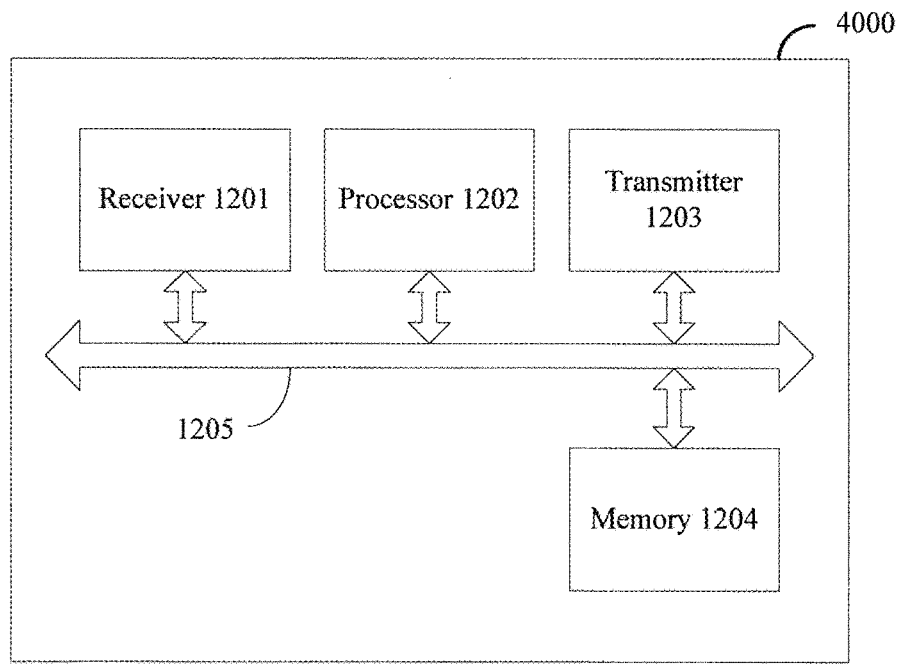
FIG. 12 is a schematic structural diagram of a device IV for establishing a secure connection according to an embodiment of the present invention.

An embodiment of the present invention provides a device IV 4000 for establishing a secure connection. As shown in FIG. 12, the device includes a receiver 1201, a processor 1202 (there may be one or more processors, and one processor is used as an example in each embodiment of the present invention), a transmitter 1203, a memory 1204, and a bus system 1205.

The processor 1202 controls an operation of the device IV 4000 for establishing a secure connection. The processor 1202 may also be called a CPU (Central Processing Unit, central processing unit). The processor 1202 may be an integrated circuit chip and has a signal processing capability. The processor 1202 may be a general purpose processor, a digital signal processor (DSP, Digital Signal Processor), an application-specific integrated circuit (ASIC, Application Specific Integrated Circuit), a field programmable gate array (FPGA, Field-Programmable Gate Array), or another programmable logical device, discrete gate or transistor logical device, or discrete hardware component. The general purpose processor may be a microprocessor or the processor may be any conventional processor and the like.

The memory 1204 may include a read-only memory and a random access memory, and provides an instruction and data to the processor 1202. A part of the memory 1204 may further include a non-volatile random access memory (NVRAM).

Components of the device IV 4000 for establishing a secure connection are coupled together by using the bus system 1205. The bus system 1205 may further include a power bus, a control bus, a status signal bus, and the like, in addition to a data bus. The bus system may be an ISA (Industry Standard Architecture, industry standard architecture) bus, a PCI (Peripheral Component Interconnect, peripheral component interconnect) bus, an EISA (Extended Industry Standard Architecture, extended industry standard architecture) bus, or the like. The bus may be one or more physical lines. When the bus is multiple physical lines, the bus may be divided into an address bus, a data bus, a control bus, and the like. In other embodiments of the present invention, the receiver 1201, processor 1202, transmitter 1203, and memory 1204 may also be connected directly by using a communications line. However, for clear description, various buses in the figure are marked as the bus system 1205.

The memory 1204 stores the following elements, executable modules or data structures, or their subsets, or their extension sets:

operation instructions, including various operation instructions and used to implement various operations; and an operating system, including various system programs and used to implement various basic services and process hardware-based tasks.

In the embodiment of the present invention, by invoking an operation instruction stored in the memory 1204 (the operation instruction may be stored in the operating system), the processor 1202 performs the following operations:

The receiver 1201 is configured to receive an encrypted asymmetric encryption public key of a second device that is sent by the second device, where the encrypted asymmetric encryption public key of the second device is encrypted by the second device by using a first public key estimated value of the device that is securely obtained in an out-of-band manner, and the first public key estimated value is a value obtained after an operation is performed based on a first key-exchange public key of the device by using a preset algorithm.

The processor 1202 is configured to decrypt, by using the first public key estimated value of the device, the encrypted asymmetric encryption public key received by the receiver 1201, and encrypt the first key-exchange public key of the device by using the decrypted asymmetric encryption public key.

The transmitter 1203 is configured to send the first key-exchange public key encrypted by the processor 1202 to the second device, so that the second device decrypts the encrypted first key-exchange public key by using an asymmetric encryption private key corresponding to the asymmetric encryption public key and generates, by using the decrypted first key-exchange public key and a key-exchange private key of the second device, a shared key for establishing a secure connection to the device.

The processor 1202 is further configured to obtain a second key-exchange public key of the second device, generate a shared key by using a key-exchange private key of the device and the obtained second key-exchange public key, and establish a secure connection to the second device by using the shared key.

Further, the receiver 1201 is further configured to receive third verification information sent by the second device, where the third verification information is a third encryption value obtained by the second device after third designated information is encrypted by using the generated shared key, or is a third hash value obtained by the second device after a hash operation is performed on third designated information by using the generated shared key, or is a signature generated after third designated information is encrypted by the second device by using the asymmetric encryption private key, where the third designated information is information that is pre-agreed upon by the device and the second device; and the processor 1202 is further configured to: after the shared key is generated, when the third verification information is the third encryption value, decrypt the third encryption value by using the generated shared key; when the third verification information is the third hash value, perform a hash operation on the third designated information by using the generated shared key; when the third verification information is the encrypted signature, decrypt the encrypted signature by using the asymmetric encryption public key; determine, according to whether the third designated information obtained after the third encryption value is decrypted is correct, whether the generated shared key is available; determine, according to whether a hash value obtained after the hash operation is performed on the third designated information matches the third hash value, whether the generated shared key is available; and determine, according to whether the third designated information obtained after the encrypted signature is decrypted is correct, whether the second device is trusted.

Further, the processor 1202 is further configured to generate fourth verification information by using the generated shared key after the shared key is generated, where the fourth verification information is a fourth encryption value obtained after fourth designated information is encrypted by using the generated shared key, or is a fourth hash value obtained after a hash operation is performed on fourth designated information by using the generated shared key, where the fourth designated information is information that is pre-agreed upon by the device and the second device; and the transmitter 1203 is further configured to send the fourth verification information generated by the processor 1202 to the second device, where the fourth verification information is used by the second device to verify, according to the received fourth verification information, whether the device is trusted.

Further, the processor 1202 is specifically configured to receive second key-exchange public key information sent by the second device, where the second key-exchange public key information is the plaintext second key-exchange public key or the second key-exchange public key encrypted by using the public key estimated value of the device; and when the received second key-exchange public key information is the encrypted second key-exchange public key, decrypt the encrypted second key-exchange public key by using the public key estimated value of the device, to obtain the decrypted second key-exchange public key.

Further, the receiver 1201 is further configured to receive, after the processor 1202 establishes the secure connection to the second device by using the shared key, an encrypted third public key estimated value of a third device that is sent by the second device;

the processor 1202 is further configured to decrypt the encrypted third public key estimated value received by the receiver 1201, and encrypt an asymmetric encryption public key of the device by using the decrypted third public key estimated value;

the transmitter 1203 is further configured to send the encrypted asymmetric encryption public key to the third device;

the receiver 1201 is further configured to receive, after the transmitter 1203 sends the encrypted asymmetric encryption public key to the third device, an encrypted third key-exchange public key sent by the third device, where the encrypted third key-exchange public key is obtained by the third device after the third device decrypts the received encrypted asymmetric encryption public key by using the third public key estimated value of the third device and encrypts the third key-exchange public key by using the decrypted asymmetric encryption public key; and the processor 1202 is further configured to decrypt, by using an asymmetric encryption private key corresponding to the asymmetric encryption public key, the encrypted third key-exchange public key received by the receiver 1201; perform, by using the preset algorithm, an operation based on the third key-exchange public key obtained through decryption, to obtain a fourth public key estimated value; and when the third public key estimated value is consistent with the fourth public key estimated value, determine that the decrypted third key-exchange public key is correct, generate a shared key by using the key-exchange private key of the device and the decrypted third key-exchange public key, and establish a secure connection to the third device by using the shared key.

An embodiment of the present invention provides a system for establishing a secure connection, where the system includes the foregoing device III and the foregoing device IV. Specific function implementation of the foregoing device III and the foregoing device IV is not further described herein. For details, reference may be made to the detailed description in each of the foregoing embodiments.

Functions of the foregoing units may correspond to corresponding processing steps in the procedures shown in FIG. 1 to FIG. 8A and FIG. 8B, and are not further described herein.

In addition, mutual reference may be made for same or similar parts between the embodiments of the present invention.

The embodiments of the present invention provide a method, a device, and a system for establishing a secure connection, which are different from the prior art. In the prior art, a first device and a second device exchange their DH public keys by using plaintexts; therefore, an attacker may pretend to be the first device knowing a PIN and obtain the DH public key of the second device, generate a shared key by using a DH private key generated by the attacker, obtain a first half value of the PIN by performing a first WPS configuration process with the second device based on a derivative key generated from the shared key, then obtain a second half value of the PIN by performing a second WPS configuration process with the second device, and thereby obtain the entire PIN and steal WiFi resources.

In the first method for establishing a secure connection according to the embodiments of the present invention, a first device and a second device neither exchange their DH public keys by using plaintexts, nor exchange encrypted PINs based on shared keys; instead, the first device securely obtains a first public key estimated value of the second device in an out-of-band manner, where the first public key estimated value is different from the PIN, where the first public key estimated value is a value obtained after an operation is performed based on a first key-exchange public key of the second device by using a preset algorithm, but the PIN may be the first public key estimated value or may be any preset value. An attacker cannot securely obtain the first public key estimated value of the second device in an out-of-band manner legally, and even if the attacker pretends to be the first device knowing the first public key estimated value, the attacker cannot obtain the first public key estimated value through two WPS configuration processes in the prior art. This is because in the method for establishing a secure connection according to the embodiments of the present invention, the first device needs to encrypt an asymmetric encryption public key of the first device by using the obtained first public key estimated value, and send the encrypted asymmetric encryption public key to the second device; the second device decrypts the encrypted asymmetric encryption public key by using the first public key estimated value of the second device, encrypts the first key-exchange public key of the second device by using the asymmetric encryption public key, and sends the encrypted first key-exchange public key to the first device; assuming that the attacker pretends to be the first device, and assuming that there is a first public key estimated value and that the attacker uses the first public key estimated value to encrypt an asymmetric encryption public key of the attacker and sends the encrypted asymmetric encryption public key to the second device, the second device cannot obtain a correct asymmetric encryption public key after using the correct first public key estimated value for decryption; then the second device encrypts the first key-exchange public key by using an incorrect asymmetric encryption public key and sends the encrypted first key-exchange public key to the attacker; the attacker cannot obtain the first key-exchange public key even by using an asymmetric encryption private key of the attacker and therefore cannot establish a secure connection to the second device; in addition, even if the attacker initiates multiple WPS processes as in the prior art, the attacker cannot establish a secure connection to the second device, and therefore cannot steal WiFi resources. Therefore, security of a network connection between devices is enhanced.

In the second method for establishing a secure connection according to the embodiments of the present invention, a first device and a second device neither exchange their DH public keys by using plaintexts, nor exchange encrypted PINs based on shared keys; instead, the second device securely obtains a first public key estimated value of the first device in an out-of-band manner, where the first public key estimated value is different from the PIN, where the first public key estimated value is a value obtained after an operation is performed based on a first key-exchange public key of the second device by using a preset algorithm, but the PIN may be the first public key estimated value or may be any preset value. An attacker cannot securely obtain the first public key estimated value of the first device in an out-of-band manner legally, and even if the attacker pretends to be the second device knowing the first public key estimated value, the attacker cannot obtain the first public key estimated value through two WPS configuration processes in the prior art. This is because in the method for establishing a secure connection according to the embodiments of the present invention, the second device needs to encrypt an asymmetric encryption public key of the second device by using the obtained first public key estimated value, and send the encrypted asymmetric encryption public key to the first device; the first device decrypts the encrypted asymmetric encryption public key by using the first public key estimated value of the first device, encrypts a first key-exchange public key of the first device by using the asymmetric encryption public key, and sends the encrypted first key-exchange public key to the second device; assuming that the attacker pretends to be the second device, and assuming that there is a first public key estimated value and that the attacker uses the first public key estimated value to encrypt an asymmetric encryption public key of the attacker and sends the encrypted asymmetric encryption public key to the first device, the first device cannot obtain a correct asymmetric encryption public key after using the correct first public key estimated value for decryption; then the first device encrypts the first key-exchange public key by using an incorrect asymmetric encryption public key and sends the encrypted first key-exchange public key to the attacker; the attacker cannot obtain the first key-exchange public key even by using an asymmetric encryption private key of the attacker and therefore cannot establish a secure connection to the first device; in addition, even if the attacker initiates multiple WPS processes as in the prior art, the attacker cannot establish a secure connection to the first device, and therefore cannot steal WiFi resources. Therefore, security of a network connection between devices is enhanced.

It should be noted that "first key-exchange public key", "second key-exchange public key", and the like involved in each embodiment of the present invention may be DH public keys, and that key exchange algorithms used in the embodiments may be DH key exchange algorithms.

Based on the foregoing descriptions of the implementation manners, a person skilled in the art may clearly understand that the embodiments of the present invention may be implemented by hardware, or may be implemented by software in addition to a necessary general hardware platform. Based on such an understanding, the technical solutions in the embodiments of the present invention may be implemented in the form of a software product. The software product may be stored in a non-volatile storage medium (which may be a CD-ROM, a USB flash drive, a removable hard disk, or the like), and includes several instructions for instructing a computer device (which may be a personal computer, a server, a network device, or the like) to perform the methods described in the embodiments of the present invention.

A person skilled in the art may understand that the accompanying drawings are merely schematic diagrams of exemplary embodiments, and modules or processes in the accompanying drawings are not necessarily required for implementing the present invention.

A person skilled in the art may understand that the modules in the apparatuses provided in the embodiments may be arranged in the apparatuses in a distributed manner according to the description of the embodiments, or may be arranged in one or more apparatuses that are different from those described in the embodiments. The modules in the foregoing embodiments may be combined into one module, or split into a plurality of submodules.

The sequence numbers of the foregoing embodiments of the present invention are merely for illustrative purposes, and are not intended to indicate priorities of the embodiments.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for establishing a secure connection, comprising:
  securely obtaining, by a first device, a first public key estimated value of a second device in an out-of-band manner, wherein the first public key estimated value is a value obtained after an operation is performed based on a first key-exchange public key of the second device by using a preset algorithm;
  encrypting, by the first device, an asymmetric encryption public key of the first device by using the obtained first public key estimated value;
  sending, by the first device, the encrypted asymmetric encryption public key and second key-exchange public key information of the first device to the second device, wherein the second key-exchange public key information comprises a second key-exchange public key of the first device, and the second key-exchange public key is used by the second device to generate a shared key by using the second key-exchange public key and a key-exchange private key of the second device and establish a secure connection to the first device by using the generated shared key;
  receiving, by the first device, the encrypted first key-exchange public key of the second device that is sent by the second device, wherein the encrypted first key-exchange public key is obtained by the second device after the second device decrypts the received encrypted asymmetric encryption public key of the first device by using the first public key estimated value of the second device and encrypts the first key-exchange public key by using the decrypted asymmetric encryption public key of the first device;

decrypting, by the first device, the encrypted first key-exchange public key by using an asymmetric encryption private key corresponding to the asymmetric encryption public key;

performing, by the first device by using the preset algorithm, an operation based on the decrypted first key-exchange public key, to obtain a second public key estimated value; and when the first public key estimated value is consistent with the second public key estimated value, determining, by the first device, that the decrypted first key-exchange public key is correct, generating a shared key by using a key-exchange private key of the first device and the decrypted first key-exchange public key, and establishing a secure connection to the second device by using the shared key.

2. The method according to claim 1, further comprising:
after generating the shared key:
  generating, by the first device, first verification information, wherein the first verification information is a first encryption value obtained after the first device encrypts first designated information by using the generated shared key, or is a first hash value obtained after a hash operation is performed by using the generated shared key in combination with first designated information, or is a signature generated after first designated information is encrypted by using the asymmetric encryption private key, wherein the first designated information is information that is pre-agreed upon by the first device and the second device; and
  sending the first verification information to the second device, wherein the first verification information is used by the second device to verify, according to the received first verification information, whether the first device is trusted.

3. The method according to claim 1, further comprising:
receiving, by the first device, second verification information sent by the second device, wherein the second verification information is a second encryption value obtained after second designated information is encrypted by using the shared key generated by the second device, or is a second hash value obtained after a hash operation is performed by using the generated shared key in combination with second designated information, wherein the second designated information is information that is pre-agreed upon by the first device and the second device; and
after the first device generates the shared key, further comprising:
  when the second verification information is the second encryption value, decrypting the second encryption value by using the shared key generated by the first device, and determining, according to whether the decrypted second designated information is correct, whether the generated shared key is available; or
  when the second verification information is the second hash value, performing a hash operation by using the shared key generated by the first device in combination with the second designated information; and determining, according to whether a hash value obtained by the first device matches the second hash value, whether the generated shared key is available.

4. The method according to claim 1, wherein after the first device establishes the secure connection to the second device by using the shared key, the method further comprises:
  securely obtaining, by the first device, a public key estimated value of a third device in an out-of-band manner; and
  encrypting the obtained public key estimated value of the third device, and sending the encrypted public key estimated value of the third device to the second device, wherein the public key estimated value of the third device is used by the second device to establish a secure connection to the third device based on the public key estimated value of the third device.

5. The method according to claim 1, wherein after the first device establishes the secure connection to the second device by using the shared key, the method further comprises:
  securely obtaining, by the first device, a third public key estimated value of a fourth device in an out-of-band manner;
  encrypting the asymmetric encryption public key of the first device by using the obtained third public key estimated value;
  sending, by the first device, the encrypted asymmetric encryption public key to the fourth device;
  receiving an encrypted third key-exchange public key of the fourth device that is sent by the fourth device, wherein the encrypted third key-exchange public key is obtained by the fourth device after the fourth device decrypts the received encrypted asymmetric encryption public key by using the third public key estimated value of the fourth device and encrypts the third key-exchange public key by using the decrypted asymmetric encryption public key;
  decrypting, by the first device, the encrypted third key-exchange public key by using a private key corresponding to the asymmetric encryption public key;
  performing, by using the preset algorithm, an operation based on the decrypted third key-exchange public key, to obtain a fourth public key estimated value; and
  when the third public key estimated value is consistent with the fourth public key estimated value, determining, by the first device, that the decrypted third key-exchange public key is correct, generating a shared key by using the key-exchange private key of the first device and the decrypted third key-exchange public key, and establishing a secure connection to the fourth device by using the shared key; and
  after the first device establishes the secure connection to the second device and the first device establishes the secure connection to the fourth device, the method further comprises:
  determining, by the first device based on the shared key generated with the second device and the shared key generated with the fourth device, connection information for establishing a secure connection between the second device and the fourth device; and
  sending the determined connection information to the second device and the fourth device separately.

6. The method according to claim 1, wherein the second key-exchange public key information of the first device is a plaintext second key-exchange public key of the first device, or is the second key-exchange public key encrypted by using the first public key estimated value of the second device.

7. A method for establishing a secure connection, comprising:
receiving, by a first device, an encrypted asymmetric encryption public key of a second device that is sent by the second device, wherein the encrypted asymmetric encryption public key of the second device is encrypted by the second device by using a first public key estimated value of the first device that is securely obtained in an out-of-band manner, and the first public key estimated value is a value obtained after an operation is performed based on a first key-exchange public key of the first device by using a preset algorithm;
decrypting, by the first device, the received encrypted asymmetric encryption public key by using the first public key estimated value of the first device, and encrypting the first key-exchange public key of the first device by using the decrypted asymmetric encryption public key;
sending, by the first device, the encrypted first key-exchange public key to the second device, so that the second device decrypts the encrypted first key-exchange public key by using an asymmetric encryption private key corresponding to the asymmetric encryption public key and generates, by using the decrypted first key-exchange public key and a key-exchange private key of the second device, a shared key for establishing a secure connection to the first device;
obtaining, by the first device, a second key-exchange public key of the second device; and
generating, by the first device, a shared key by using a key-exchange private key of the first device and the obtained second key-exchange public key, and establishing a secure connection to the second device by using the shared key.

8. The method according to claim 7, further comprising:
receiving, by the first device, third verification information sent by the second device, wherein the third verification information is a third encryption value obtained by the second device after third designated information is encrypted by using the generated shared key, or is a third hash value obtained by the second device after a hash operation is performed on third designated information by using the generated shared key, or is a signature generated after third designated information is encrypted by the second device by using the asymmetric encryption private key, wherein the third designated information is information that is pre-agreed upon by the first device and the second device; and
after the first device generates the shared key, further comprising:
when the third verification information is the third encryption value, decrypting, by the first device, the third encryption value by using the shared key generated by the first device, and
determining, according to whether the decrypted third designated information is correct, whether the generated shared key is available; or
when the third verification information is the third hash value, performing, by the first device, a hash operation on the third designated information by using the shared key generated by the first device, and
determining, according to whether a hash value obtained by the first device matches the third hash value, whether the generated shared key is available; or
when the third verification information is the encrypted signature, decrypting, by the first device, the encrypted signature by using the asymmetric encryption public key, and
determining, according to whether the decrypted third designated information is correct, whether the second device is trusted.

9. The method according to claim 7, further comprising:
after generating the shared key:
generating, by the first device, fourth verification information by using the generated shared key, wherein the fourth verification information is a fourth encryption value obtained by the first device after fourth designated information is encrypted by using the generated shared key, or is a fourth hash value obtained after a hash operation is performed on fourth designated information by using the generated shared key, wherein the fourth designated information is information that is pre-agreed upon by the first device and the second device; and
sending the fourth verification information to the second device, wherein the fourth verification information is used by the second device to verify, according to the received fourth verification information, whether the first device is trusted.

10. The method according to claim 7, wherein obtaining, by the first device, the second key-exchange public key of the second device comprises:
receiving second key-exchange public key information sent by the second device, wherein the second key-exchange public key information is the plaintext second key-exchange public key or the second key-exchange public key encrypted by using the first public key estimated value of the first device; and
when the received second key-exchange public key information is the encrypted second key-exchange public key, decrypting the encrypted second key-exchange public key by using the first public key estimated value of the first device, to obtain the decrypted second key-exchange public key.

11. The method according to claim 7, wherein after the secure connection is established with the second device by using the shared key, the method further comprises:
receiving, by the first device, an encrypted third public key estimated value of a third device that is sent by the second device;
decrypting the received encrypted third public key estimated value, and encrypting an asymmetric encryption public key of the first device by using the decrypted third public key estimated value;
sending, by the first device, the encrypted asymmetric encryption public key to the third device;
receiving an encrypted third key-exchange public key sent by the third device, wherein the encrypted third key-exchange public key is obtained by the third device after the third device decrypts the received encrypted asymmetric encryption public key by using the third public key estimated value of the third device and encrypts the third key-exchange public key by using the decrypted asymmetric encryption public key;

decrypting, by the first device, the encrypted third key-exchange public key by using an asymmetric encryption private key corresponding to the asymmetric encryption public key;

performing, by using the preset algorithm, an operation based on the decrypted third key-exchange public key, to obtain a fourth public key estimated value; and when the third public key estimated value is consistent with the fourth public key estimated value, determining, by the first device, that the decrypted third key-exchange public key is correct, generating a shared key by using the key-exchange private key of the first device and the decrypted third key-exchange public key, and establishing a secure connection to the third device by using the shared key.

12. A device for establishing a secure connection, comprising:

a processor, configured to securely obtain a first public key estimated value of a second device in an out-of-band manner, where the first public key estimated value is a value obtained after an operation is performed based on a first key-exchange public key of the second device by using a preset algorithm, and encrypt an asymmetric encryption public key of the device by using the obtained first public key estimated value;

a transmitter, configured to send the asymmetric encryption public key encrypted by the processor and second key-exchange public key information of the first device to the second device, where the second key-exchange public key information includes a second key-exchange public key of the first device, and the second key-exchange public key is used by the second device to generate a shared key by using the second key-exchange public key and a key-exchange private key of the second device and establish a secure connection to the first device by using the generated shared key; and a receiver, configured to receive the encrypted first key-exchange public key of the second device that is sent by the second device, where the encrypted first key-exchange public key is obtained by the second device after the second device decrypts the received encrypted asymmetric encryption public key of the device by using the first public key estimated value of the second device and encrypts the first key-exchange public key by using the decrypted asymmetric encryption public key of the device;

where the processor is further configured to:
decrypt, by using an asymmetric encryption private key corresponding to the asymmetric encryption public key, the encrypted first key-exchange public key received by the receiver, perform, by using the preset algorithm, an operation based on the first key-exchange public key obtained through decryption, to obtain a second public key estimated value, and when the first public key estimated value is consistent with the second public key estimated value:
determine that the decrypted first key-exchange public key is correct,
generate a shared key by using a key-exchange private key of the device and the decrypted first key-exchange public key, and
establish a secure connection to the second device by using the shared key.

13. The device according to claim 12, wherein the processor is further configured to:

generate first verification information after generating the shared key, where the first verification information is a first encryption value obtained by the processor after first designated information is encrypted by using the generated shared key, or is a first hash value obtained by the processor after a hash operation is performed by using the generated shared key in combination with first designated information, or is a signature generated after first designated information is encrypted by the processor by using the asymmetric encryption private key, where the first designated information is information that is pre-agreed upon by the device and the second device; and the transmitter is further configured to send the first verification information generated by the processor to the second device, where the first verification information is used by the second device to verify, according to the received first verification information, whether the device is trusted.

14. The device according to claim 12, wherein the receiver is further configured to:

receive second verification information sent by the second device, where the second verification information is a second encryption value obtained after second designated information is encrypted by using the generated shared key after the shared key is generated by the second device, or is a second hash value obtained after a hash operation is performed by using the generated shared key in combination with second designated information, where the second designated information is information that is pre-agreed upon by the device and the second device; and the processor is further configured to:
after the shared key is generated:
when the second verification information received by the receiver is the second encryption value, decrypt the second encryption value by using the shared key generated by the processor,
when the second verification information is the second hash value, perform a hash operation by using the shared key generated by the processor in combination with the second designated information,
determine, according to whether the second designated information obtained after the second encryption value is decrypted is correct, whether the generated shared key is available, and
determine, according to whether a hash value obtained by the processor after the hash operation is performed on the second designated information matches the second hash value, whether the generated shared key is available.

15. The device according to claim 12, wherein the processor is further configured to:

securely obtain a public key estimated value of a third device in an out-of-band manner after the device establishes the secure connection to the second device by using the shared key; and the transmitter is further configured to:
encrypt the public key estimated value of the third device that is obtained by the processor, and send the encrypted public key estimated value of the third device to the second device, where the public key estimated value of the third device is used by the second device to establish a secure connection to the third device based on the public key estimated value of the third device.

16. The device according to claim 12, wherein the processor is further configured to:
   securely obtain a third public key estimated value of a fourth device in an out-of-band manner after the device establishes the secure connection to the second device by using the shared key, and
   encrypt the asymmetric encryption public key of the device by using the obtained third public key estimated value;
the transmitter is further configured to:
   send the asymmetric encryption public key encrypted by the processor to the fourth device;
the receiver is further configured to:
   receive an encrypted third key-exchange public key of the fourth device that is sent by the fourth device, where the encrypted third key-exchange public key is obtained by the fourth device after the fourth device decrypts the received encrypted asymmetric encryption public key by using the third public key estimated value of the fourth device and encrypts the third key-exchange public key by using the decrypted asymmetric encryption public key; the processor is further configured to:
      decrypt, by using a private key corresponding to the asymmetric encryption public key, the encrypted third key-exchange public key received by the receiver;
      perform, by using the preset algorithm, an operation based on the third key-exchange public key obtained through decryption, to obtain a fourth public key estimated value;
      when the third public key estimated value is consistent with the fourth public key estimated value:
         determine that the decrypted third key-exchange public key is correct,
         generate a shared key by using the key-exchange private key of the device and the decrypted third key-exchange public key, and
         establish a secure connection to the fourth device by using the shared key; and
      after the device establishes the secure connection to the second device and the device establishes the secure connection to the fourth device, determine, based on the shared key generated with the second device and the shared key generated with the fourth device, connection information for establishing a secure connection between the second device and the fourth device; and
the transmitter is further configured to:
   send the connection information determined by the processor to the second device and the fourth device separately.

17. A device for establishing a secure connection, comprising:
   a receiver, configured to receive an encrypted asymmetric encryption public key of a second device that is sent by the second device, where the encrypted asymmetric encryption public key of the second device is encrypted by the second device by using a first public key estimated value of the device that is securely obtained in an out-of-band manner, and the first public key estimated value is a value obtained after an operation is performed based on a first key-exchange public key of the device by using a preset algorithm;
   a processor, configured to:
      decrypt, by using the first public key estimated value of the device, the encrypted asymmetric encryption public key received by the receiver, and
      encrypt the first key-exchange public key of the device by using the decrypted asymmetric encryption public key; and
   a transmitter, configured to:
      send the first key-exchange public key encrypted by the processor to the second device, so that the second device decrypts the encrypted first key-exchange public key by using an asymmetric encryption private key corresponding to the asymmetric encryption public key and generates, by using the decrypted first key-exchange public key and a key-exchange private key of the second device, a shared key for establishing a secure connection to the device;
   where the processor is further configured to:
      obtain a second key-exchange public key of the second device,
      generate a shared key by using a key-exchange private key of the device and the obtained second key-exchange public key, and
      establish a secure connection to the second device by using the shared key.

18. The device according to claim 17, wherein the receiver is further configured to receive third verification information sent by the second device, where the third verification information is a third encryption value obtained by the second device after third designated information is encrypted by using the generated shared key, or is a third hash value obtained by the second device after a hash operation is performed on third designated information by using the generated shared key, or is a signature generated after third designated information is encrypted by the second device by using the asymmetric encryption private key, where the third designated information is information that is pre-agreed upon by the device and the second device; and
the processor is further configured to:
   after the shared key is generated:
      when the third verification information is the third encryption value, decrypt the third encryption value by using the generated shared key,
      when the third verification information is the third hash value, perform a hash operation on the third designated information by using the generated shared key,
      when the third verification information is the encrypted signature, decrypt the encrypted signature by using the asymmetric encryption public key,
      determine, according to whether the third designated information obtained after the third encryption value is decrypted is correct, whether the generated shared key is available,
      determine, according to whether a hash value obtained after the hash operation is performed on the third designated information matches the third hash value, whether the generated shared key is available, and
      determine, according to whether the third designated information obtained after the encrypted signature is decrypted is correct, whether the second device is trusted.

19. The device according to claim 17, wherein the processor is further configured to:
   generate fourth verification information by using the generated shared key after the shared key is generated, where the fourth verification information is a fourth encryption value obtained after fourth designated information is encrypted by using the generated shared key, or is a fourth hash value obtained after a hash operation is performed on fourth designated information by using the generated shared key, where the fourth designated information is information that is pre-agreed upon by the device and the second device; and the transmitter is further configured to send the fourth verification information generated by the processor to the second device, where the fourth verification information is used by the second device to verify, according to the received fourth verification information, whether the device is trusted.

20. The device according to claim 17, wherein the processor is configured to:
  receive second key-exchange public key information sent by the second device, where the second key-exchange public key information is a plaintext second key-exchange public key or the second key-exchange public key encrypted by using the public key estimated value of the device; and
  when the received second key-exchange public key information is the encrypted second key-exchange public key, decrypt the encrypted second key-exchange public key by using the public key estimated value of the device, to obtain the decrypted second key-exchange public key.

* * * * *